US010337452B2

(12) United States Patent
Powell et al.

(10) Patent No.: US 10,337,452 B2
(45) Date of Patent: Jul. 2, 2019

(54) ENERGY RECOVERY SYSTEM

(71) Applicant: Warren Engine Company, Inc., Alexandria, VA (US)

(72) Inventors: Gregory B. Powell, Rockville, MD (US); James C. Warren, Alexandria, VA (US)

(73) Assignee: Warren Engine Company, Inc., Alexandria, VA (US)

( * ) Notice: Subject to any disclaimer, the term of this patent is extended or adjusted under 35 U.S.C. 154(b) by 51 days.

(21) Appl. No.: 15/621,711

(22) Filed: Jun. 13, 2017

(65) Prior Publication Data
US 2017/0356310 A1    Dec. 14, 2017

Related U.S. Application Data

(60) Provisional application No. 62/349,346, filed on Jun. 13, 2016, provisional application No. 62/419,188, filed on Nov. 8, 2016.

(51) Int. Cl.
| | |
|---|---|
| *F01N 3/02* | (2006.01) |
| *F02G 5/04* | (2006.01) |
| *F02B 63/04* | (2006.01) |
| *F24D 11/00* | (2006.01) |
| *F24D 17/00* | (2006.01) |
| *F01K 23/08* | (2006.01) |
| *F01K 23/10* | (2006.01) |
| *H01M 8/04014* | (2016.01) |
| *F01K 23/06* | (2006.01) |

(52) U.S. Cl.
CPC .............. *F02G 5/04* (2013.01); *F01K 23/065* (2013.01); *F01K 23/08* (2013.01); *F01K 23/10* (2013.01); *F01N 3/02* (2013.01); *F01N 3/0205* (2013.01); *F02B 63/044* (2013.01); *F24D 11/005* (2013.01); *F24D 17/001* (2013.01); *F24D 17/0005* (2013.01); *H01M 8/04022* (2013.01); *F24D 2200/26* (2013.01); *Y02E 20/14* (2013.01)

(58) Field of Classification Search
CPC ... Y02E 20/14; F24D 17/001; F24D 2200/26; F24D 11/005; F24D 11/009; F24D 17/0005; F02B 63/044–048; F02G 5/00–04; F02G 5/02; F02G 5/04; Y02T 10/166; F01N 3/0205
See application file for complete search history.

(56) References Cited

U.S. PATENT DOCUMENTS

| 4,657,290 A | * | 4/1987 | Linden | ............... F02B 63/04 290/2 |
| 5,433,379 A | * | 7/1995 | Harrison | ............... F24D 3/08 237/19 |

(Continued)

FOREIGN PATENT DOCUMENTS

| JP | 59037248 A | * | 2/1984 | ............... F02G 5/02 |
| JP | 60235993 A | * | 11/1985 | ............... F02G 5/00 |

*Primary Examiner* — Mark A Laurenzi
*Assistant Examiner* — Xiaoting Hu
(74) *Attorney, Agent, or Firm* — Capitol Patent & Trademark Law Firm, PLLC

(57) ABSTRACT

A combined heat and power system, or an energy system, is provided. A four-stroke opposed-piston engine provides efficient power from a generator set or genset. A heat exchange system is provided within the energy system to provide efficient waste heat recovery as the engine is operated.

13 Claims, 20 Drawing Sheets

(56) References Cited

U.S. PATENT DOCUMENTS

| | | | |
|---|---|---|---|
| 2002/0153127 A1 | 10/2002 | Togawa et al. | |
| 2004/0173164 A1 | 9/2004 | Denis | |
| 2004/0224823 A1 | 11/2004 | Warren | |
| 2010/0170466 A1* | 7/2010 | Warren | F01L 1/30 123/190.1 |
| 2011/0041784 A1* | 2/2011 | McAlister | C25B 1/02 123/3 |
| 2011/0127004 A1* | 6/2011 | Freund | F02C 6/16 165/45 |

* cited by examiner

ENERGY RECOVERY SYSTEM

CROSS-REFERENCE TO RELATED APPLICATIONS

This application claims the benefit of U.S. Provisional Patent Application Ser. No. 62/349,346 filed on Jun. 13, 2016, and, this application also claims the benefit of U.S. Provisional Patent Application No. 62/419,188 having a filing date of Nov. 8, 2016, the teachings of both provisional applications herein incorporated by reference.

TECHNICAL FIELD

The present invention relates generally to a combined heat and power unit that stores, captures, and utilizes heat generated from an engine for a variety of applications, for example.

BACKGROUND OF THE INVENTION

A continuing challenge is to economically provide energy while yet reclaiming various aspects of the energy development such as heat. Yet another challenge is to reduce carbon emissions when operating combustion engines to produce energy such as electrical energy. Oftentimes, heat generated by combustion within the engine is wasted. Furthermore, challenges such as packaging and engine efficiency remain as design concerns in the development of combined heat and power systems.

Other challenges include complying with the relevant EPA or other environmental regulatory references when providing in-home or in-dwelling engines used to power a combined heat and power system. Accommodating all of these concerns within one energy unit remains an ongoing challenge.

SUMMARY OF THE INVENTION

The above-referenced challenges are resolved by the present invention. The present energy recovery system includes a genset that converts mechanical energy into electricity and produces heat in three ways: through the engine exhaust stream, through the engine coolant stream, and by radiant or convective heat. The genset, a combination of an engine and an electric generator, provides electricity and heat energy from the thermodynamic transfer created during the operation of the engine. Although not necessarily so limited, a preferred genset configuration is shown in FIG. 18, as explained below.

The present invention includes: a housing containing an exhaust; a first pressure vessel contained within the housing for heating a liquid; a second vessel or storage container contained within the first pressure vessel for containing a liquid; a four-stroke opposed piston engine and preferably, wherein the engine is contained within the housing and the engine contains a cooling jacket housing a coolant, an exhaust vent or duct, and an air intake; a first heat exchanger fluidly communicating with the exhaust vent or duct and thermodynamically communicating with a first hot liquid storage container; and, a second heat exchanger in fluid communication with the cooling jacket surrounding the engine, the second heat exchanger in thermodynamic communication with a second liquid storage container.

One object of the present invention is to provide an engine within the housing that provides sufficient energy to operate a combined heat and power unit for a dwelling. Yet another object of the invention is to provide an engine that complies with all Environmental Protection Agency (EPA) and other regulations relative to the use of an engine within a dwelling. Yet another object of the present invention is to provide a four-stroke opposed piston engine that can be efficiently packaged within a housing containing the constituents of the combined heat and power unit. Yet another object of the invention is to maximize the heat recovery and the reclaimed heat application throughout the dwelling and perhaps, exterior of the dwelling.

A preferred embodiment of the present invention orients the exhaust vent or duct of the engine to be proximate to the entry of the first heat exchanger. In this way, the heat from the engine exhaust provides optimal thermodynamic efficiency

DETAILED DESCRIPTION OF THE INVENTION

The present invention utilizes an opposed-piston engine to provide energy from the thermo-dynamic transfer of heat energy created during the operation of the four-stroke opposed piston engine. Although not necessarily so limited, a preferred engine is a four-stroke opposed piston engine that utilizes a fuel other than diesel. Other fuels include gasoline, propane, or natural gas, for example. Certain efficiencies are realized with the use of an opposed-piston configuration, particularly when a four-stroke engine is employed. It has been found that packaging efficiencies are improved thereby resulting in a more-compact energy unit. Further, it has been found that a four-stroke opposed piston engine is compliant with pertinent environmental regulations of the EPA.

Figure 18:
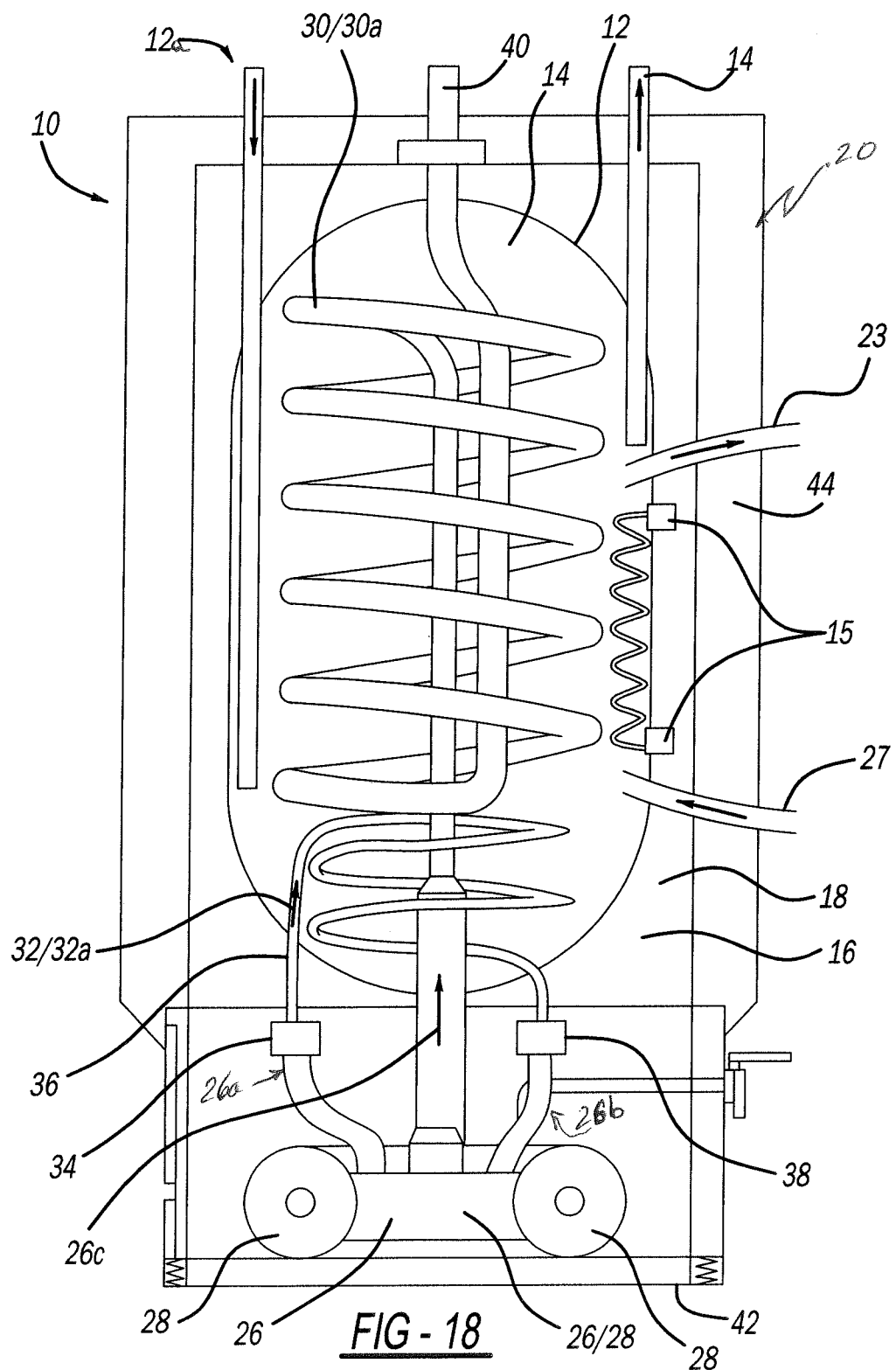
FIG. 18 illustrates an exemplary combined heat and power system of the present invention.

The present energy recovery system 10 includes an engine that produces heat in both the exhaust stream and in a coolant stream. A housing 20 contains a first pressure vessel 12 containing a first fluid or liquid 14, such as water. A second pressure vessel 16 also contains a second fluid or liquid 18 such as water. The second vessel 16 may be a boiler formed such as described in U.S. Pat. No. 8,763,564 or 9,303,896, for example, the teachings of which are herein incorporated by reference as if fully stated. The first vessel or boiler 12, which in a preferred embodiment is essentially formed as a hot water tank in a known manner, is surrounded by the second vessel 16, and is actually immersed within the fluid 18 of the second vessel 16. The second vessel 16 or hot water storage tank, may be formed as a hot water tank in a known manner, and contains a cold water inlet 22 and a hot water outlet 24. An engine 26, preferably a four-stroke opposed piston engine as described below but not restricted to that design, is also contained within the housing 20 but not within either pressure vessel 12, 16, and provides combustion energy to produce electricity. At least one generator 28 is combined with the engine 26 in a known way, and when combined forms a "genset" 26/28, as schematically shown in FIG. 18. FIG. 18 also shows a dual generator genset 26/28, in accordance with the present invention. It has been found that the efficiencies presented by the novel genset 26/28 described, provide synergistic efficiencies with regard to recovering waste heat through the present energy recovery system, environmental advantages, and packaging efficiencies.

In accordance with the present invention, the engine 26 also produces waste heat that is directed from the engine 26 through an engine exhaust vent or duct during operation of the engine 26, as exhaust 26c. A first heat exchanger 30 is positioned within the first storage tank/pressure vessel 12 and fluidly communicates with the engine 26 whereby engine exhaust 26c is directed from the engine 26 through the first heat exchanger coil 30a as shown in FIG. 18, and then out a vent 40 from the housing 20. The first heat exchanger coil 30a may be formed from a thermally conductive material such as a metal, stainless steel for example, that thermally conducts heat into the fluid or water of the first storage tank/pressure vessel 12. A second heat exchanger 32 is positioned within the second storage tank/pressure vessel 16, and fluidly communicates with the engine whereby engine coolant 32b is directed through the second heat exchanger coil 32a. The second heat exchanger coil 32a may be formed from a thermally conductive material such as a metal, copper or brass for example. As shown in FIG. 18, a compressor 34 is connected to a coolant outlet 26a and a coolant inlet 26b on the engine, such that heated coolant 36 may be pumped from the engine 26, compressed and further heated, and then passed through the second heat exchanger 32 within the second pressure vessel 16. As the coolant passes through the second heat exchanger, the coolant is cooled to transfer heat to the second fluid 18, water, or liquid within the second pressure vessel 16. Once the coolant 36 has travelled through the second heat exchanger 32, and prior to the coolant 36 being reintroduced into the engine 26, the coolant 36 is passed through an expander valve 38 to thereby expand the coolant 36 to an even cooler state as it reenters the engine 26 through coolant inlet 26b. Also shown is a hot fluid exit 23 from vessel 12 and a cooled fluid inlet 27 to vessel 12, representing a closed loop to a furnace and associated heat exchanger, for example. Accordingly, the present system recovers heat from both the exhaust and coolant systems of the engine.

Unless otherwise stated herein, such as with the details of the four-stroke opposed-piston engine or with the details of the heat exchangers 30 and 32, the Combined Heat and Power (CHP) system shown in FIG. 18 may be constructed as known in the art. Accordingly, U.S. Pat. Nos. 9,617,897, 9,097,152, 6,823,668, 7,021,059, and 7,574,853 are instructional and are herein incorporated by reference in their entireties. Further, U.S. Patent Publication Nos. 2016/0194997, 2009/0205338, and 2013/0247877 are instructional and are herein incorporated by reference in their entireties. Finally, EP2503110 and WO 2011/028401 are also instructional, and are herein incorporated by reference in their entireties.

As shown in FIG. 18, the exhaust from the first heat exchanger is vented from the boiler or first vessel 12 through a boiler exhaust. As the water is heated within the water storage tank or first vessel 12, hot water 14 is pumped out to provide hot water for a variety of applications, and cold makeup water 12a is introduced into the water storage tank or first vessel 12. As also schematically shown in FIG. 18, a temperature controller 15 may control the temperature of the water 14 in the hot water tank 12, and in the boiler 16. Accordingly, the operation of the engine may be coordinated with the temperature control system by increasing or decreasing the engine operating cycles/minute, respectively. An outer housing 44 is preferably formed about the combined heat and power system 10, thereby forming a soundproof enclosure.

Figure 20:
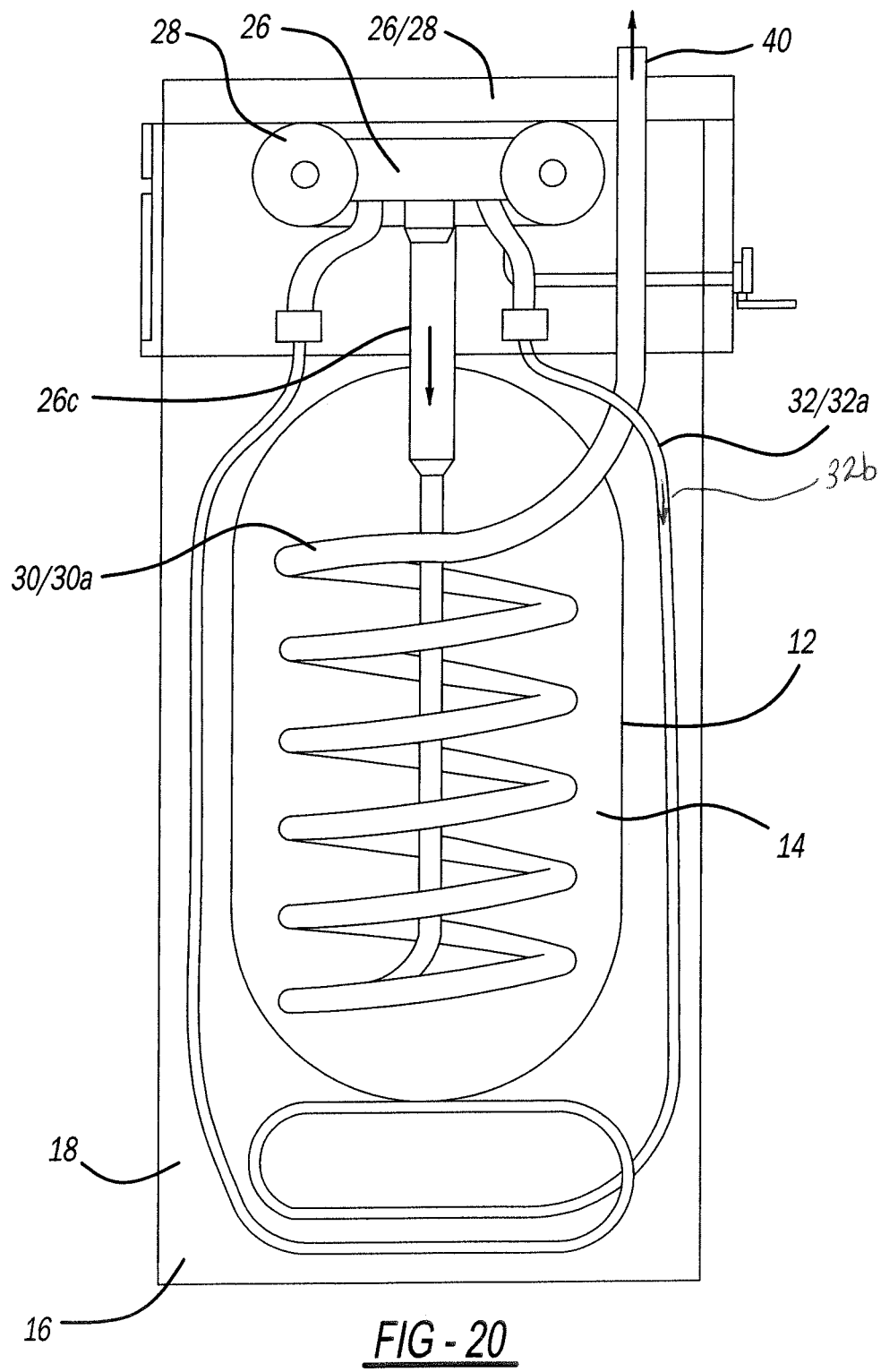
FIG. 20 illustrates a preferred embodiment of the present invention.

It will be appreciated that the exhaust conduit 527e of the engine 26 (as explained below) and the heat exchange coil 32a of the housing are preferably proximate to each other to optimize convection and maximize heat recovery through heat transferred from the engine exhaust to the fluid 18 within the second pressure vessel 16. See FIG. 20.

As also schematically shown in FIG. 18, the combined heat and power system 10, or energy system 10, preferably contains a suspension or dampening system 42 to mitigate the effects of the vibration of the engine, in the home or office for example. Related thereto, vibration-resistant couplings for the intake, radiator, exhaust, and fuel supply of the engine 26 may also be integrated into the dampening system 42 as schematically shown in FIG. 18.

Figure 19:
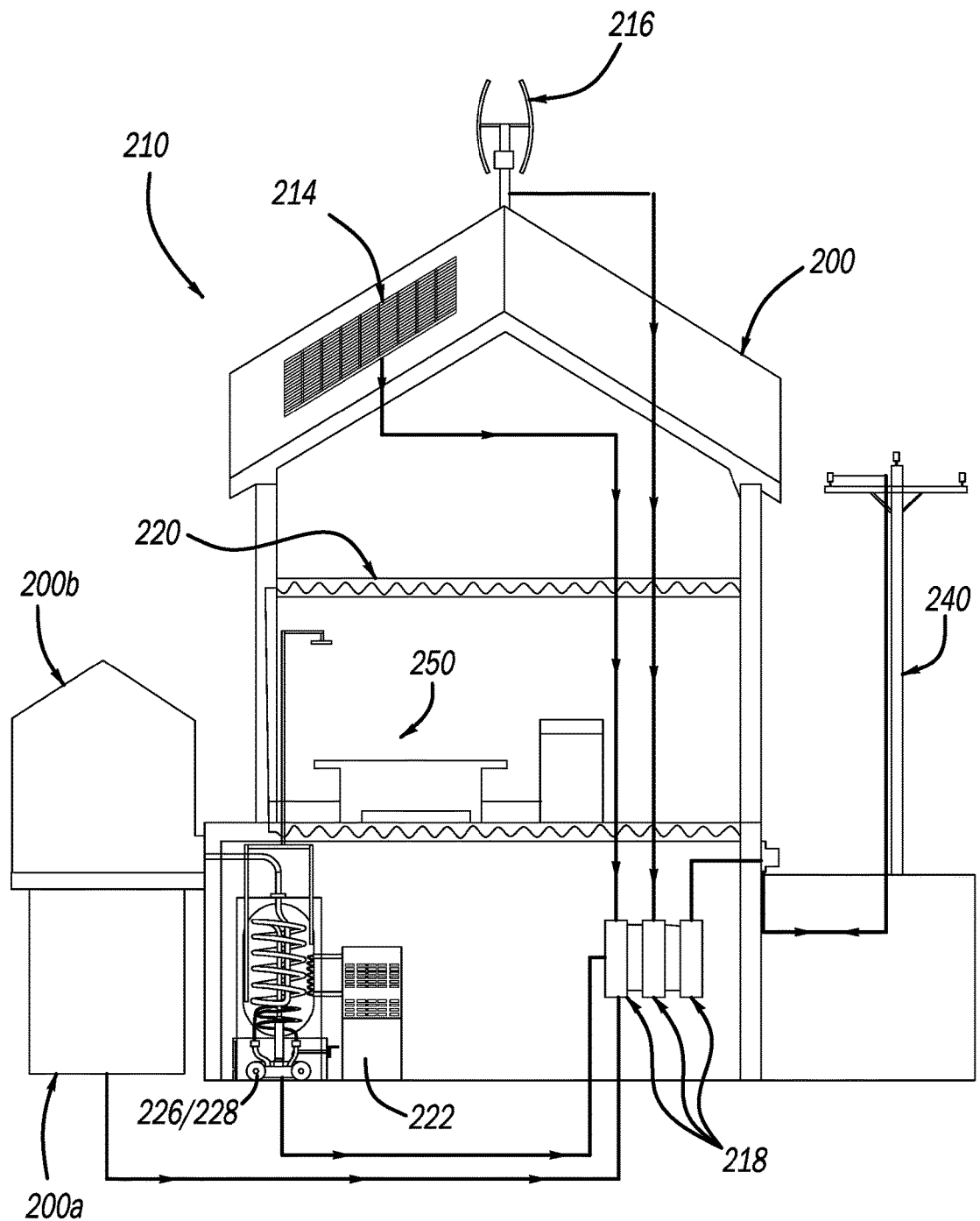
FIG. 19 illustrates application of the reclaimed heat of the combined heat and power system of FIG. 18.

As schematically shown in FIG. 19, a combined heat and power system 210 provides electricity that may be used to power various applications 250 around a dwelling or house 200 auxiliary applications such as a heated driveway 200a and a greenhouse 200b. As also shown, hot water from the hot water tank 212 may be plumbed to heat the dwelling through radiant floor heating 220, to augment the heat provided by a furnace 222 through heat exchange at the furnace, to heat a pool (not shown), and other hot water applications including supplying the household hot water supply, for example. Other energy collectors may also be integrated into a total energy storage center wherein solar panels 214 providing photovoltaic energy, wind turbines 216 providing rotary power, and so forth may be integrated into a total power strategy. Excess energy from the engine/generator or genset 226/228, the solar panels 214, and the wind turbine 216 may be stored in a battery pack 218. Furthermore, excess energy may be sold back to the existing power grid 240 as needed.

In accordance with the present invention, a preferred engine is described below.

Exemplary Four-Stroke Opposed Piston Engine

Certain novel aspects of the present invention, with regard to the engine for example, are presented below. U.S. Pat. Nos. 7,004,120 and 7,779,795, and U.S. patent application Ser. Nos. 15/442,617 and 13/633,097 are related to the present invention, of which the teachings of each document are herein incorporated by reference in their entireties.

An opposed piston engine 500 contains an engine housing 505 containing a first cylinder 510 and a second cylinder 510'. A first pair of opposed pistons 520 and 530 are housed within the first cylinder 510. A second pair of opposed pistons 520' and 530' are housed within the second cylinder 510'. Although discussion is directed to the first cylinder 510 containing pistons 520 and 530, the same discussion is applicable with regard to second cylinder 510' and opposed pistons 520' and 530'.

Referring to the FIGURES, opposed pistons 520 and 530 are connected via respective connecting rods 522 and 532 to respective crankshafts 540 and 542 mounted in engine housing 505 as described in U.S. Pat. No. 7,004,120. Pistons 520 and 530 reciprocate within cylinder 510 to rotate the crankshafts, in a manner known in the art. Each associated crankshaft and/or connecting rod is configured to aid in providing a predetermined stroke length to its associated piston residing within the cylinder. The opposed first and second pistons 520 and 530 may be of a relatively standard design, and may have predetermined lengths and predetermined diameters.

In one embodiment, the stroke length of each of pistons 520 and 530 is about 3 inches. Thus, the total difference between the spacing of the pistons at closest approach to each other (i.e., at "top dead center") may range from 0 inches to 0.25 inches, and more preferably from about 0.05 inches to 0.2 inches, and the maximum spacing of the pistons during the engine cycle (i.e., at "bottom dead center") is about 4-7 inches, and more preferably about 6 inches. As will be apparent to one of ordinary skill in the art, these distances may be altered depending on specific design criteria.

If desired, the piston lengths may be adjusted (to substantially equal lengths) for controlling spacing between the piston faces, thereby providing a means for adjusting the compression ratio and generally providing a predetermined degree of compression for heating intake air to facilitate combustion of a fuel injected or otherwise inserted into the combustion chamber. The piston lengths are geometrically determined in accordance with the piston stroke length and the lengths of apertures (described below) formed in the cylinders through which flow exhaust gases and air for combustion. In one embodiment, each piston cap 524 and 534 is formed from a sandwich of two sheets of carbon fiber with a ceramic center. The piston caps 524 and 534 which are exposed to the combustion event are formed so that when the two piston caps 524 and 534 meet in the center of the cylinder 510 they preferably form a somewhat toroidal, hour-glass-shaped, or otherwise-shaped cavity as the combustion chamber 521, as shown in the Figures. Only the ceramic cores of the piston caps 524 and 534 actually come into contact with the stationary cylinder wall.

Each piston should have a length from the piston fire ring to the cap suitable for keeping the piston rings out of the cylinder opening(s) 510a. The piston caps 524 and 534 each have a diameter roughly equal to the interior of the associated cylinder, and may be made of carbon fiber, ceramic, or any other suitable material to aid in minimizing thermal inefficiencies during engine operation.

In an embodiment utilizing a delivery conductor and ground conductor for spark generation (as described in U.S. Pat. No. 7,448,352), the face of each piston may also include a slot(s) or groove(s) (not shown) formed therein and configured for providing a clearance between the piston face and the delivery and ground conductors, as the pistons approach each other within the cylinder.

Crankshafts 540 and 542 are coupled to an associated gear train, generally designated 512. Gear train contains a first gear 512a fixed to the first crankshaft 540 about a medial portion 540' thereof, and further contains a second gear 512b fixed to the second crankshaft 542 about a medial portion 542' thereof. The gear train 512 further contains a third gear 512c with teeth enmeshed with the teeth of first gear 512a, and, a fourth gear 512d with teeth enmeshed with the teeth of second gear 512b. The teeth of third and fourth gears 512c and 512d are also enmeshed with each other, whereby the movement of any of gears 512a-512d causes a consequential movement of the remaining gears as shown in the Figures. In accordance with one embodiment of the present invention, the diameter d2 of the third and fourth gears 512c and 512d is twice the diameter d1 of first and second gears 512a and 512b, thereby resulting in a two to one ratio with regard to size of the inner gears 512c and 512d and the outer gears 512a and 512b. It will be appreciated that gears 512a-512d exemplify one drive mechanism, and that the drive mechanism 512 of the engine 500 may also be represented by a drive belts or drive chains, with the same size ratio between the respective driving elements of the belt or chain-driven drive mechanism.

In further accordance with the present invention, and in one embodiment of the present invention, the drive mechanism or gear train 512 converts rotational motion of the crankshafts to rotational motion of a first and second pair of cam discs 550, 550', 552, and 552'. Accordingly, the first pair of cam discs 550 and 552 are each rotationally and coaxially fixed and mounted to the exterior of the third gear 512c, such that the gear 512c and the associated pair of cam discs 550 and 552 all rotate at the same speed. In one embodiment, these cam discs 550 and 552 operate the inlet valves for each cylinder. In the same way, the second pair of cam discs 550' and 552' are each rotationally and coaxially fixed and mounted to the exterior of the fourth gear 512d, such that the gear 512d and the associated cam discs 550' and 552' all rotate at the same speed. In the same embodiment, these cam discs 550' and 552' operate the exhaust valves for each cylinder.

Figure 16:
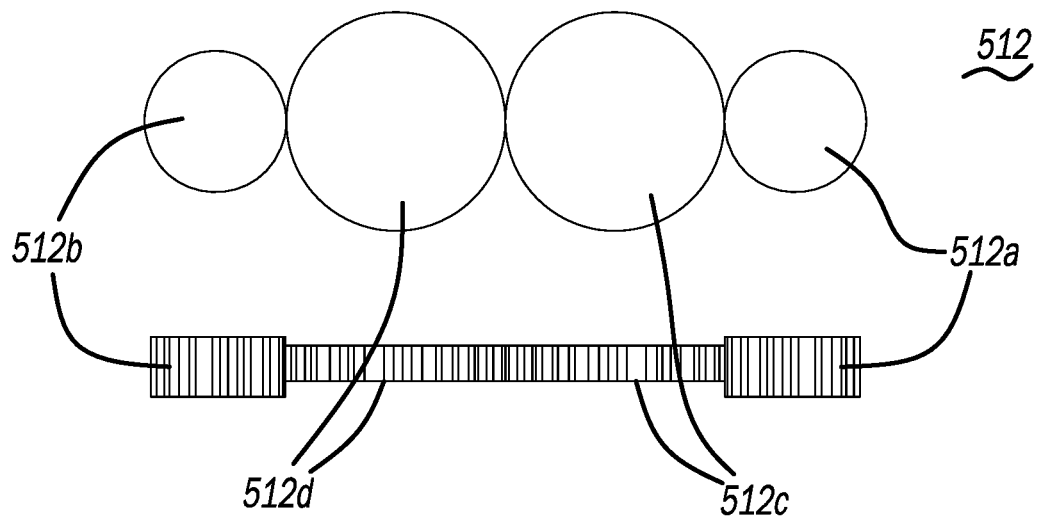
FIG. 16 illustrates a geared drive system of the present invention.
Figure 17:
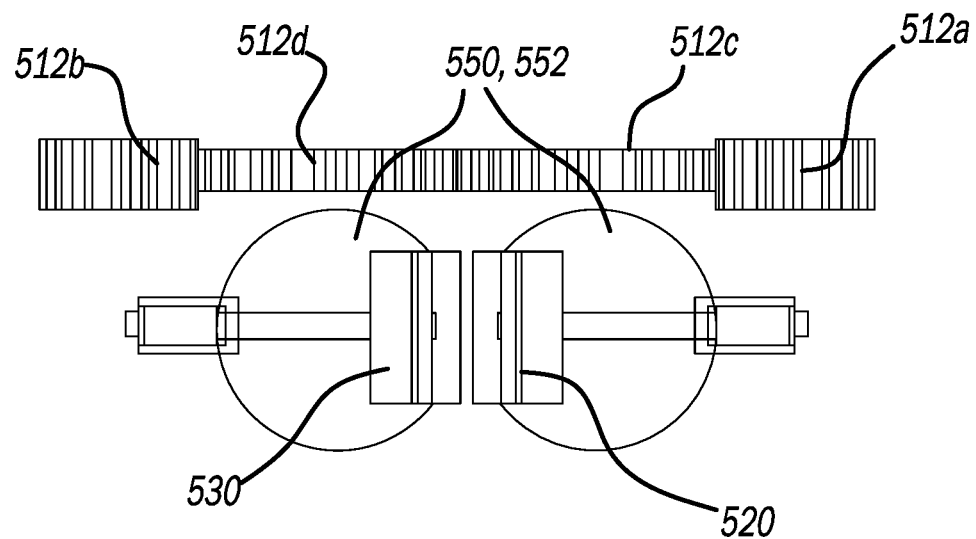
FIG. 17 illustrates a geared drive system of the present invention.

FIGS. 16 and 17 show a side view and a plan view of the gear train 512. Referring to FIGS. 16 and 17, in this particular embodiment, gears 512a, 512b connected to crankshafts 542, 540 (not shown in FIGS. 16 and 17) respectively, rotate at crankshaft speed but are reduced in size to serve as reducing gears. Thus, the rotational speeds of the gears 512c and 512d (and the rotational speeds of the cam discs 520, 522, 520', and 522' to which they are connected) are reduced to one half of the crankshaft speed.

Various elements of the vehicle and/or engine systems (for example, an oil pump or coolant circulation pump) may be operatively coupled to and powered by the gear train 512, via the gears in the gear train itself or via shafts and additional gears operatively coupled to the gear train.

Referring again to FIGS. 1-9, the cam discs 550, 552, 550', and 552', are incorporated into the engine to actuate associated valve assemblies 530, 532, 534, and 536 (described below) which open and close to permit a flow of air to (and exhaust gases from) each cylinder combustion chamber 521 during operation of the engine. The cam discs 520, 522, 220', and 222' are mounted on the gears 512c and 512d, respectively, so as to be rotatable along with the gears 512c and 512d, and the elements are positioned so as to engage actuatable portions of the valve assemblies 530, 532, 534, 536 during cam rotation.

Figure 8:
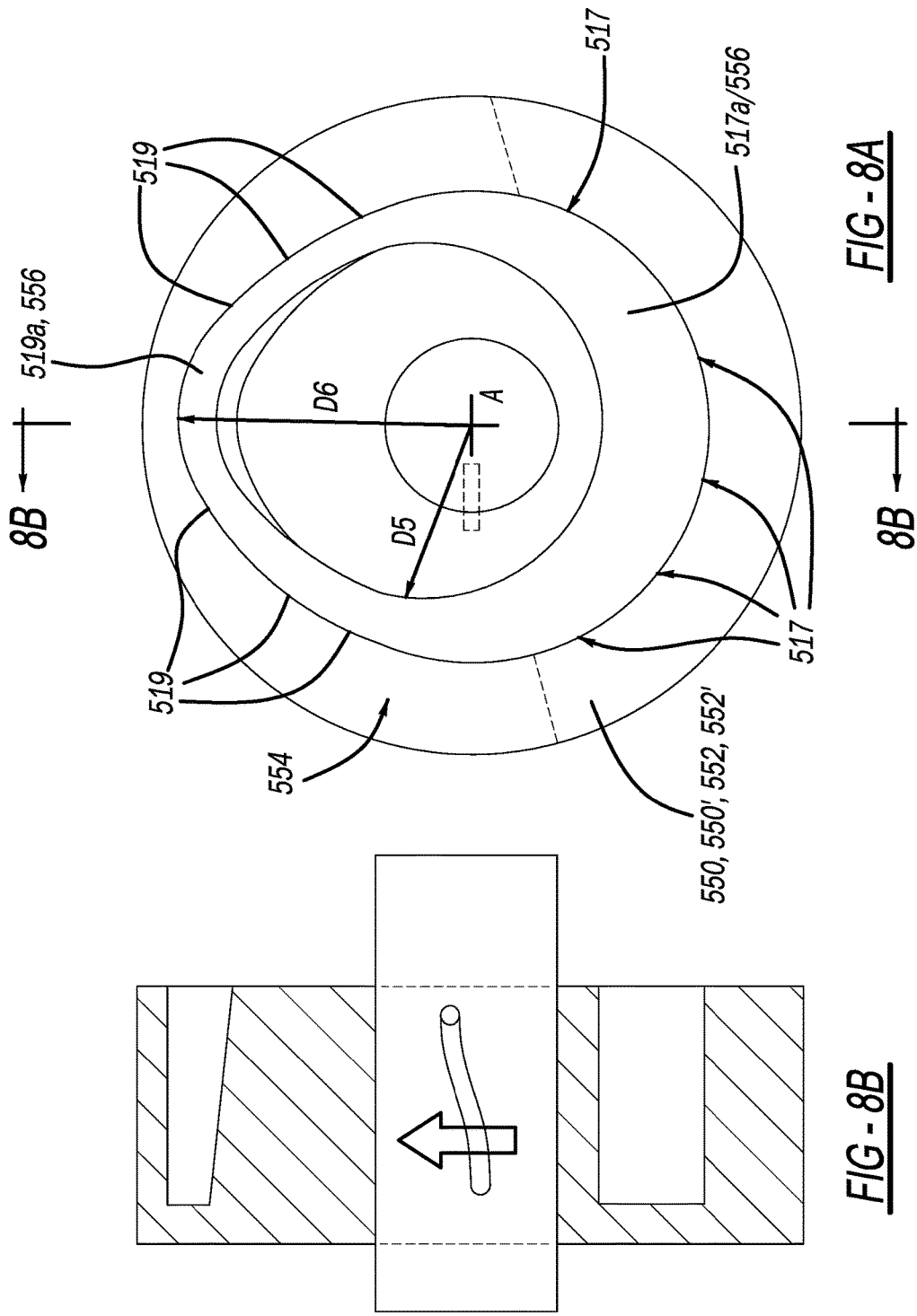
FIGS. 8A and 8B illustrate a Cam-Ring detail of one embodiment of the present invention.

Referring to FIG. 8, in one embodiment, each of camming elements or discs 550, 552, 550', and 552' includes one or more base portions 517 and one or more projecting portions 519 that project radially outwardly, the projection portions 519 contiguously connected to the base portions 517. Each base portion 517 defines a cam profile or surface 517a, 556 engageable with an actuatable portion of an associated valve assembly to produce a first state of the valve assembly. Each projecting portion 519 defines a cam profile or surface 519a, 556 engageable with the actuatable portion of the valve assembly to produce an associated alternative state of the valve assembly.

Figure 14:
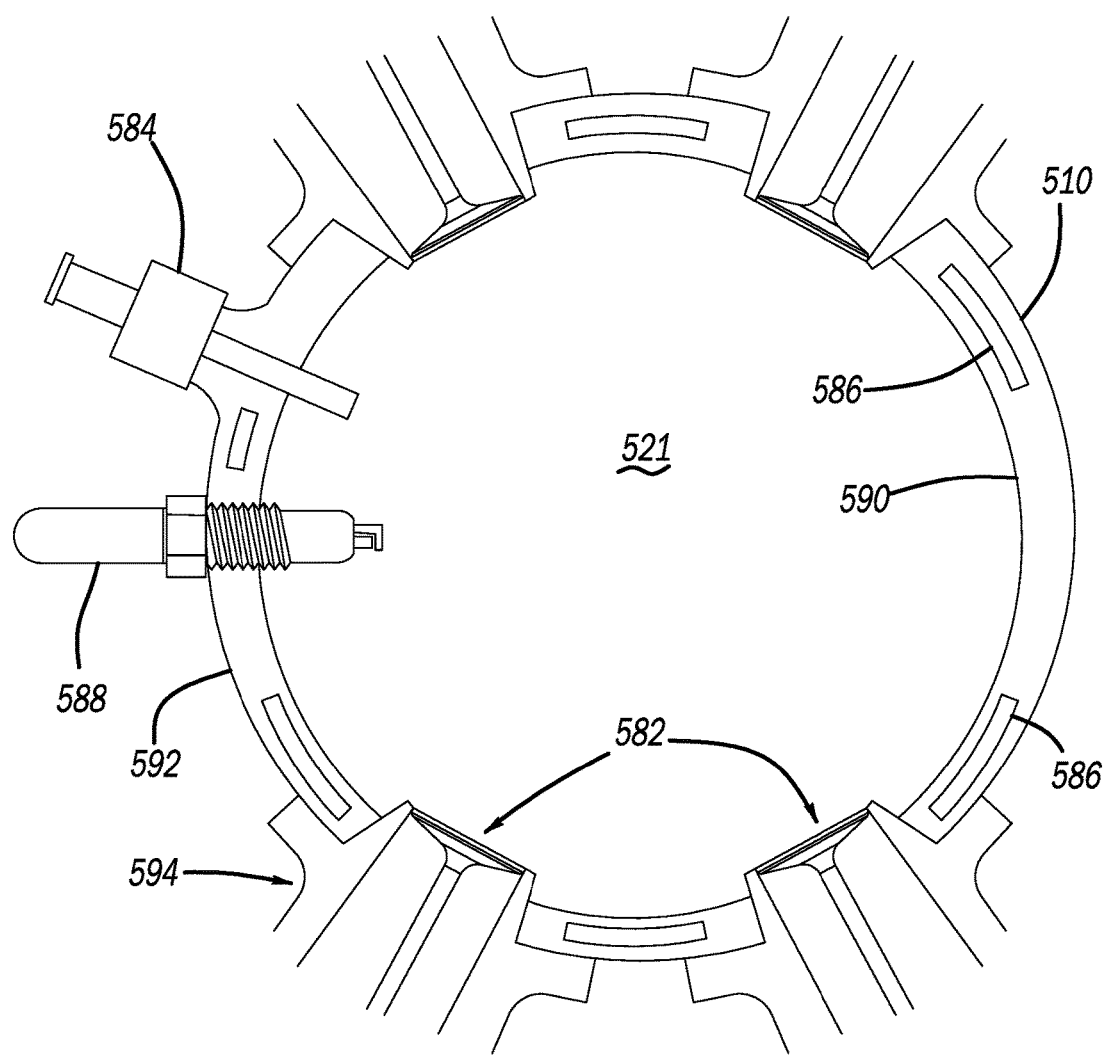
FIG. 14 illustrates an exemplary combustion chamber, in accordance with the present invention.
Figure 15:
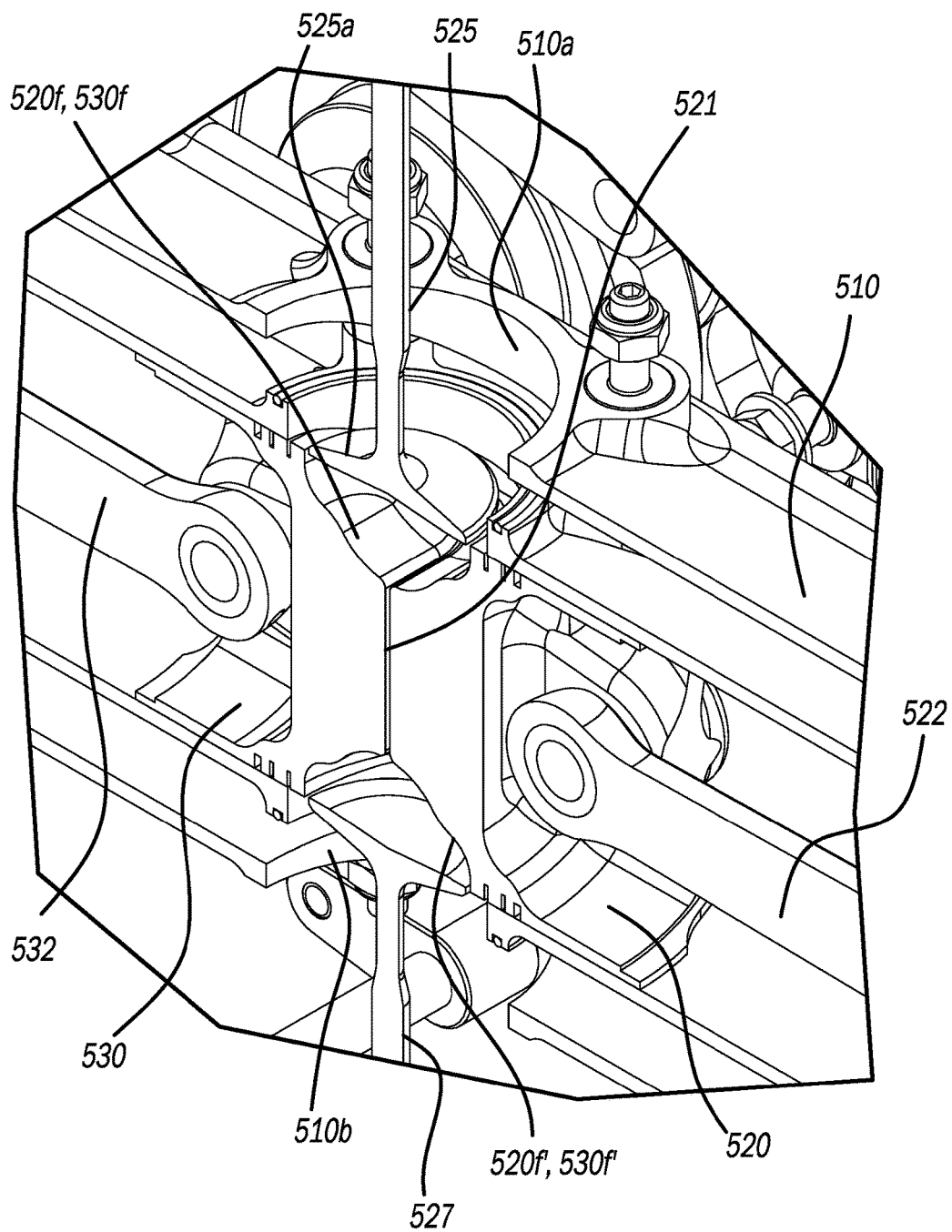
FIG. 15 illustrates two pistons at top dead center, in accordance with the present invention.

The valve assemblies 530, 532, 534, 536 of the present invention may be any applicable valve assembly. A preferred valve assembly is formed in a known manner as a Desmodromic valve assembly. As known in the art, a Desmodromic valve is a reciprocating engine valve that is positively closed by a cam and leverage system, rather than by a more conventional spring. Each Desmodromic valve assembly contains a plurality of connected armatures for actuation of an associated valve responsive to the cam groove of the cam disc. The width and the depth of the cam groove 554 may be tailored to affect the desired timing of the respective valve actuation. Alternatively, the cam disc 550-552' might itself be spooled inwardly toward the gear drive 512 or outwardly away from the gear drive 512 by known drivers, thereby obviating the need to vary the depth of the cam groove 554 to accomplish the same function. A first armature 537 of the valve assembly contains a cam follower 539 that traces the cam groove 554 as the cam disc 550-552' rotates responsive to the associated gear 512c or 512d. In general, the mechanism by which a camming surface engages a follower arm to actuate a rocker arm so as to open and close an associated poppet valve is known in the art, and the similar operation of the particular valve embodiments shown in the FIGURES to control flow into and out of the cylinder combustion chamber 521 are described herein. Referring to FIGS. 14 and 15, a spherical cam roller 539 is attached to a first end 537a of the first armature 537, and slidably engages the cam groove 554 as the cam disc 550, 550', 552, 552' (e.g. 550-552') rotates. A second armature 541 is pivotally engaged with a second end 537b of the first armature 537 at a first pivotable connection 545, whereby a ball joint, pin, or other pivoting means connects the second end 537b of the first armature 537 with a first end 541a of the second armature 541. The second armature 541 is substantially orthogonal or perpendicular to the first armature 537 during operation of the cam disc 550-552'. A third armature 543 is pivotally engaged with a second end 541b of the second armature 541 at a second pivotable connection 549, whereby a second ball joint, pin, or other pivoting means connects the second end 541b of the second armature 541 with a first end 543a of a third armature 543. The third armature 543 is substantially orthogonal or perpendicular to the second armature 541. A valve actuator 547 is fixed to a second end 543b of the third armature 543 and opens and closes the associated valve as the cam disc 550-552' rotates to provide a bias or pressure at the valve actuator end 543b of the third armature 543. Stated another way, as the cam disc 550/550' rotates from the base portions 517 through the projecting portions 519, a resultant torque or bias on the plurality of armatures cyclically affects a leverage on the rocker arm 547 thereby affecting the opening and closing of the associated valve 525/527.

A conventional poppet valve 525/527, has a conventional valve stem 525a/527a having a plug 525b/527b mounted to a first end 525c/527c of the stem, whereby the first end of the stem is fixed to the rocker arm or valve actuator 547. A valve seat 525d/527d is contained in the cylinder opening 510a/510b and functions as a valve guide and seat during operation of the four-stroke cycle. As indicated in the FIGURES, the valve 525/527 opens and closes as it vertically moves within the valve guide or valve seat 525d/527d. A corresponding detent or depression 520a/530a, collectively formed in the geometry of the dual-piston 520/530 interface at top dead center, provides a clearance for operation of the valve within the cylinder.

The base and projecting portions 517, 519 of the cam 550-552' are positioned and secured with respect to each other so as to form a continuous camming surface or profile 556 engageable by an associated actuatable valve element (such as a cam follower 539 as described above) as the cam disc 550-552' rotates. Thus, the actuatable valve element or cam follower 539 will alternately engage the cam base portion(s) 517 and any projecting portion(s) 519 as the cam 550-552' rotates.

In the embodiment shown in the FIGURES, the cam discs 550-552' or surfaces are arranged so as to reside on at least one side of the gears 512c and 512d. The projecting portions 519 of the cam disc 550-552' extend radially outwardly to a greater degree than the base portions 517 of the cam disc 550, 552. Thus, a portion of an actuatable valve element 539 engaging a base portion 517 of a cam will be forced radially outwardly when a cam projecting portion 519 rotates so as to engage the actuatable valve portion.

If desired, the size of the cylinder opening 510a, 510b leading into (or from) the combustion chamber 521 may be controlled by suitably dimensioning the radial distances of an associated portion of the cam profile with regard to the radial distances of the base portions 517 and the radial distances of the projecting portions 519 of the cam disc 550, 552. The amount of time or proportion of the engine cycle during which the valve is either open or closed may also be controlled by appropriately specifying the arc length occupied by the base portions 517 and projecting portions 519 of the cam profile 556. Transition of the valve assembly from a first state to a second state may be provided by a ramp or slope (or profile) 519a formed in part of the projecting portion 519.

FIG. 8 illustrates an exemplary embodiment wherein the base portions 517 of the cam profiles 556 reside at equal radial distances from an axis A extending through the center of the cam disc 550,552, and wherein the projecting portions 519 of the cam profiles 556 reside at ramped radial distances, that is radial distances gradually increasing and then gradually decreasing toward and relative to the constant radial distances of the base portions 517. As seen in FIG. 8, the distances of the projecting portion profiles 519a, 556 from the rotational axis A of the cam disc 550-552' are greater than the distances of the base portion profiles 517a, 556 from the rotational axis A of the cam disc 550-552'. Thus, this embodiment provides two states (for example, "valve open" and "valve closed"), each state corresponding to a distance of one of the base portion profile or the projecting portion profile from the rotational axis A of the cam disc 550, 550', 552, 552', between which an associated valve assembly alternates during rotation of the cam 550-552'.

In other embodiments, any one of multiple intermediate states of the valve assembly may be achieved and maintained by providing cam projecting portions defining cam surfaces located at corresponding distances from the rotational axis A of the cam disc 550. All cam discs 550-552' essentially operate in the same manner. For example, in one embodiment, beginning at a point in the base projection, the intake valve 525 is opened as the exemplary cam disc 550 rotates 180 degrees from the beginning point, and the cam follower 539 cycle through greater radial distances as the disc 550 rotates through the projecting portions 519 of the disc, thereby defining the intake cycle of the four-stroke process. As the cam disc 550 continues to rotate, the intake valve 525 is closed as the cam disc 550 again approaches the base portions 517, and the compression cycle is conducted from about 181 degrees to 360 degrees of the rotation through the base portions 517 of the cam disc 550. As the cam disc 550 continues to rotate another 180 degrees for a total of 540 degrees, the expansion or combustion cycle is conducted, whereby both of the intake and exhaust valves 525, 527 are closed to seal the combustion chamber 521 during the expansion cycle. Finally, as the cam disc 550 rotates another 180 degrees for a total of 720 degrees of rotation, the exhaust cycle is completed whereby all exhaust gases exit the cylinder as they are shunted through the exhaust valve 527. Once the exhaust cycle is complete, the cam disc 550 then repeats the process to again rotate 720 degrees as the four-stroke process is repeated during the engine operation. In the embodiment shown in FIG. 8, a cam base portion surface 556 may be dimensioned to provide a closed state of the valve 525 or valve 527. In addition, a first projecting portion 519 having a camming surface 519a spaced a first radial distance D5 from the rotational axis A of the cam disc 550 when mounted on intermediate gear 512c (or 512d) may provide a "partially open" state of the valve 525 when engaged by an associated actuatable valve portion. Also, a camming surface 519a, 556 formed on projecting portion 219 (or on a separate projecting portion) and spaced a second radial distance D6 from the rotational axis A greater than the first distance D5 may provide a "fully open" state of the valve 525 when engaged by the actuatable valve portion. See FIG. 8

In a particular embodiment, when the actuatable portion or cam follower 539 of the valve assembly 530, 532, 534, or 536 engages and slides along the base portion(s) 517 of the cam profile 556, the associated valve assembly is in a closed condition (i.e., the valve assembly prevents flow of air into (or exhaust gases from) the cylinder combustion chamber 521. Also, when the cam follower or actuatable portion 539 of the valve assembly engages and slides along the projecting portion(s) 519, the valve assembly is in an open or partially open condition (i.e., the valve assembly permits flow of air into (or exhaust gases from) the cylinder combustion chamber 521.

The camming discs or elements 550-552' may be in the form of rings or other structures attachable to the exterior surface of the gears 512c and 512d. In a particular embodiment, the base and projecting portions 517 and 519, respectively, of the camming elements or discs 550, 550', 552, or 552', are modular in construction so that these elements may be changed out to provide any of a variety of cam profiles. In addition, the projecting portions of a cam profile may be changed out independently of the base portions of the profile. These options enable greater flexibility in control of the valve sequencing, enabling correspondingly greater control of the engine cycle.

Base portion(s) 517 and projecting portion(s) 519 may be attached to the cam disc 550 (or any other of the cam discs) using any suitable method, thereby creating a first arcuate region defined by the base portions 517 and a second arcuate region that is defined by ramped radial lengths of the projecting portions 519 as shown in FIG. 8.

Because the projecting portion 519 actuating the valve 525 can be relocated so as to engage the valve 525 either sooner or later during rotation of the cam disc 550 (and, therefore, sooner or later in the engine cycle), the associated valve 525 may be opened or closed either sooner or later during the engine cycle. Thus, in one embodiment, the detachability and modularity of the camming elements 517 and 519 of the cam disc 550 may enable fine tuning of the engine cycle by adjustment of the valve actuation timing.

Alternatively, the cam discs 550, 550', 552, 552' may be formed as a machined monolithic disc wherein the respective cam groove 554 defined by the base portions 517 and projecting portions 519 may be altered by changing the entire cam disc 550 for one that has been machined to change the variability of the radial distances of the projecting portions 519, and perhaps the arcuate length of the base portions 517 and the projecting portions 519. The change in the design of the cam groove 554 therefore facilitates actuation of the valve 525 (or the valve 527) at a different point in the engine cycle and/or for a different length of time.

A follower 539 operatively connected to an associated valve 525 and valve 527 engages and follows the camming surfaces 556 of the disc 550 as the disc rotates. When the follower 539 reaches and engages a plurality of the ramped camming surface 519a residing in the projecting portions 519 of the cam disc 550 (as shown in FIG. 8), the follower 539 is raised as described elsewhere herein, causing the follower 539 or a pushrod coupled to the follower 539 to rotate a rocker arm 547, resulting in the opening of the valve 525 or 527, depending on where the follower 539 engages the cam groove 554. Accordingly, in this embodiment, one valve assembly 532 operable by cam disc 550 may be positioned below the engine to actuate a valve mechanism positioned beneath the engine, while another valve assembly operable by cam disc 550' is positioned above the engine to actuate a valve mechanism 534 positioned above the engine.

Figure 1:
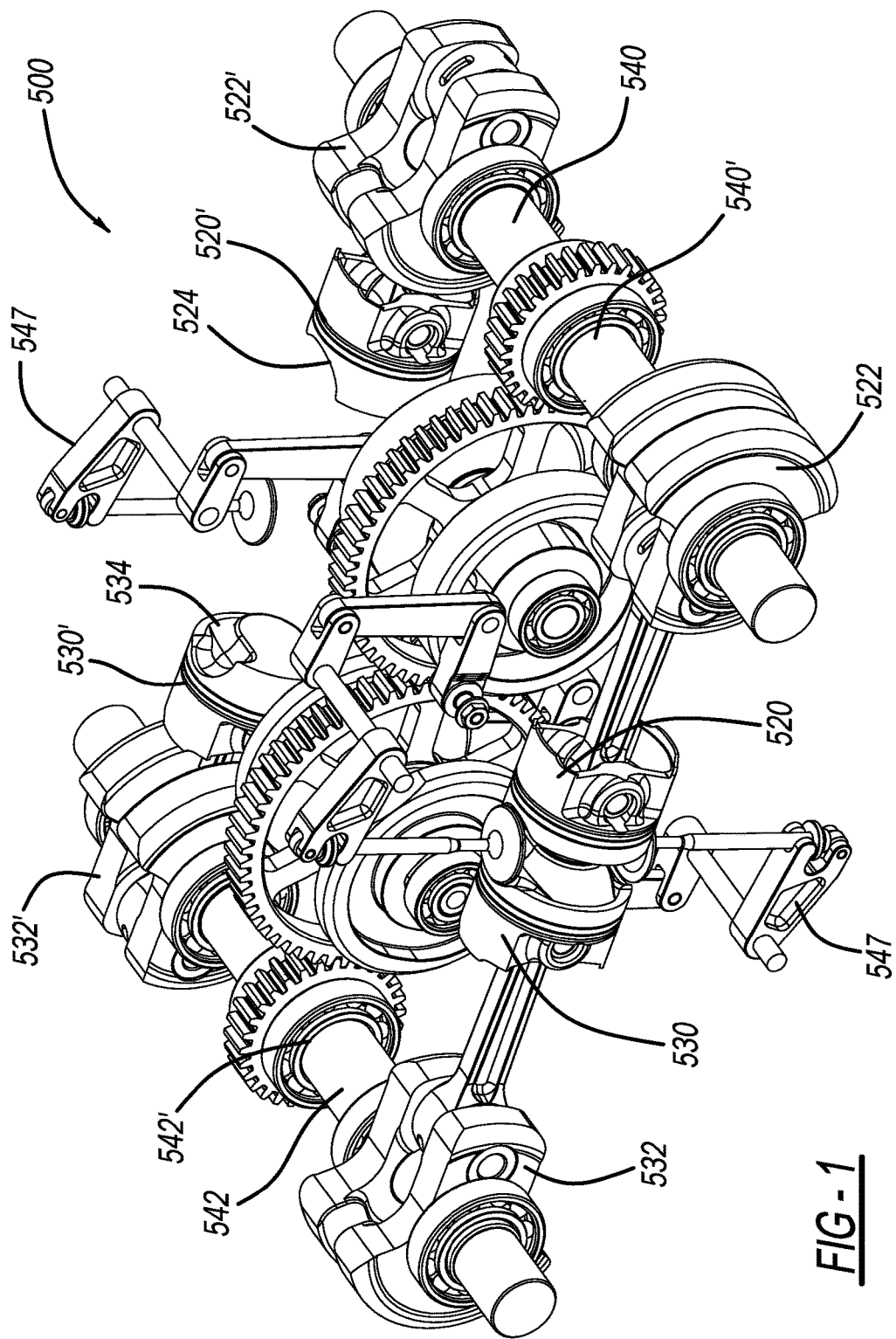
FIG. 1 is a perspective view of a preferred engine, in accordance with the present invention.
Figure 2:
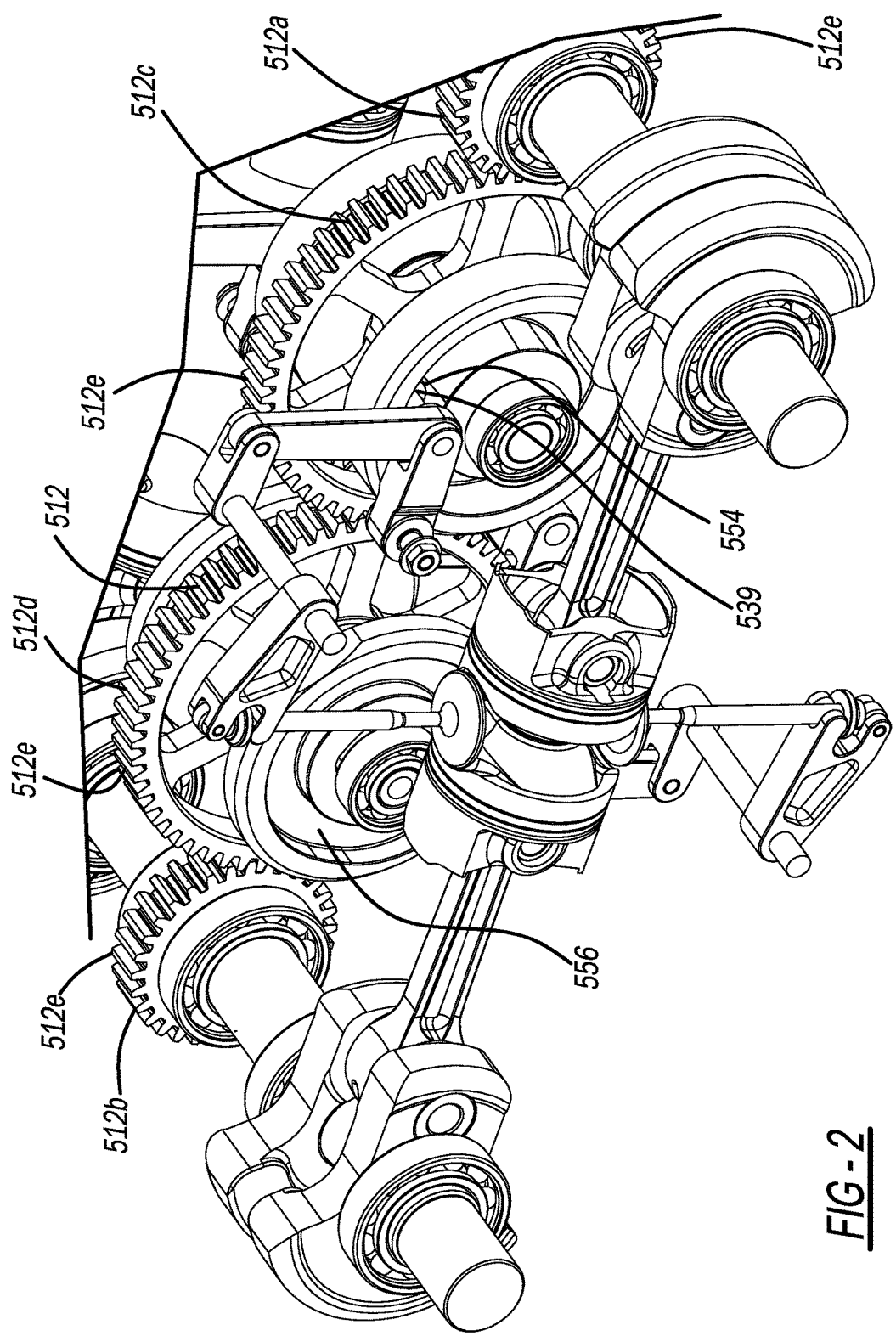
FIG. 2 is a perspective view of a preferred engine, in accordance with the present invention.
Figure 3:
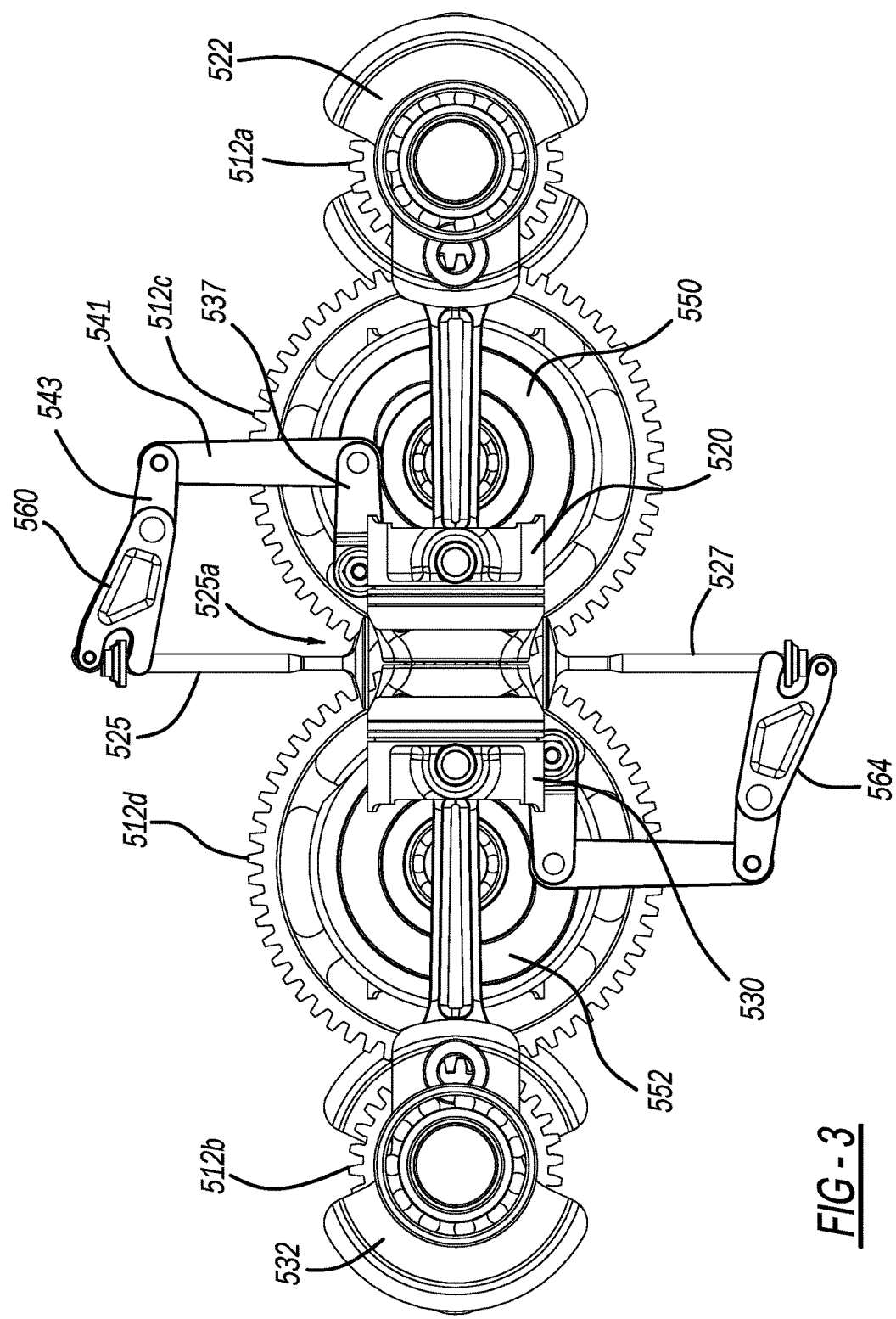
FIG. 3 is a side view of a preferred engine, in accordance with the present invention.
Figure 4:
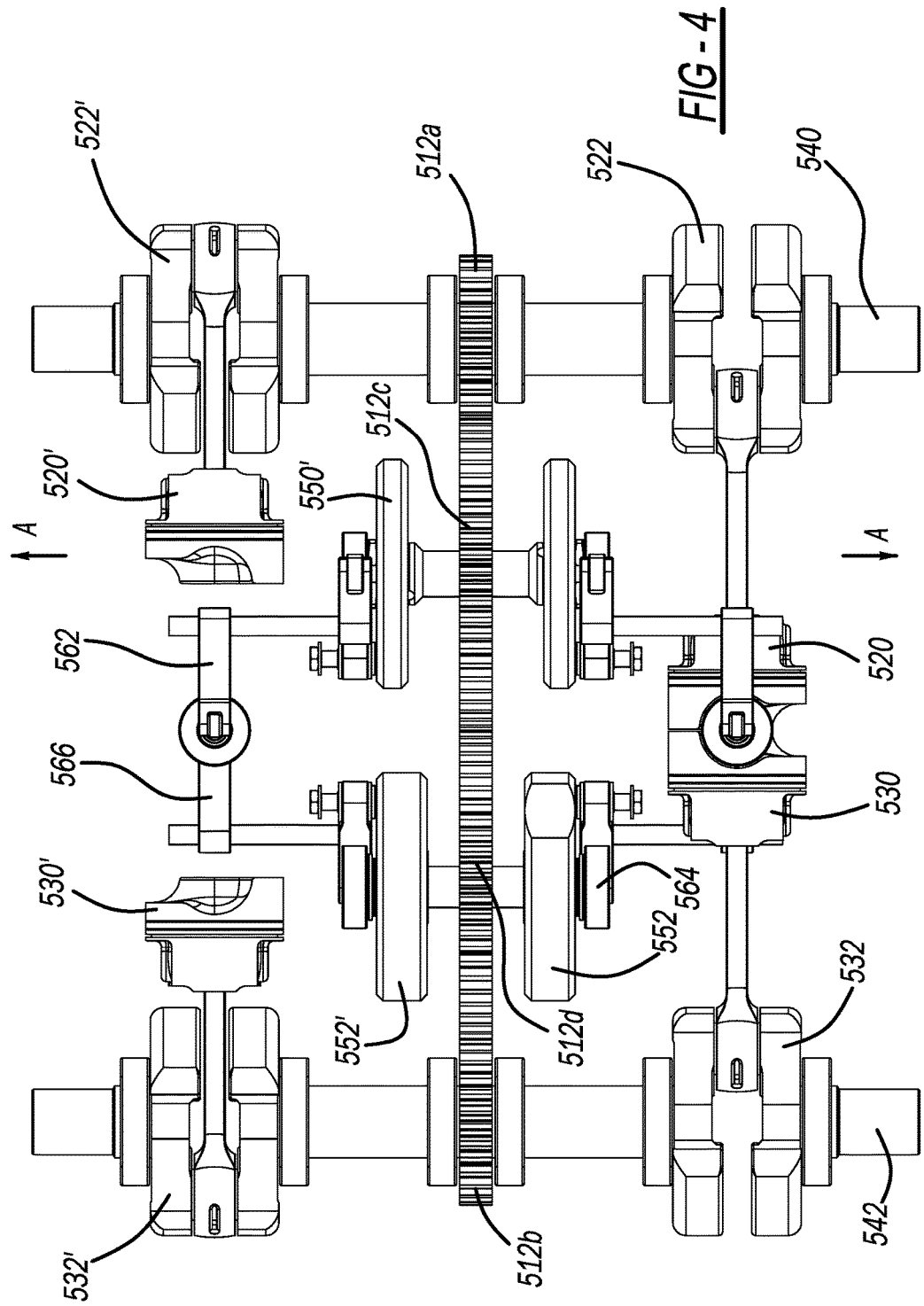
FIG. 4 is a top view of preferred engine, in accordance with the present invention.
Figure 5:
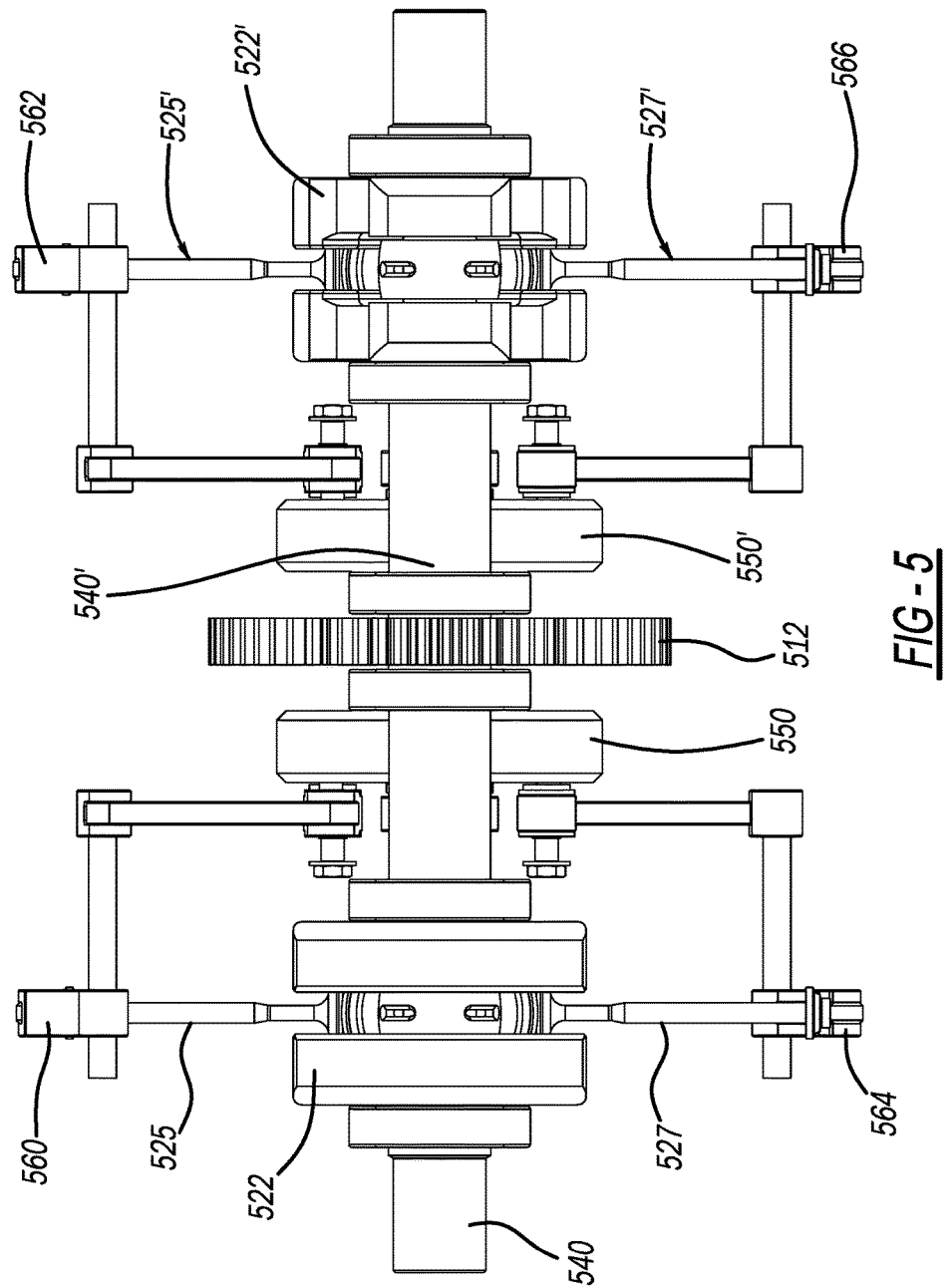
FIG. 5 is a rear view of preferred engine, in accordance with the present invention.

Referring to FIG. 5, in another embodiment, a cam disc 550 as previously described is mounted coaxially with gear 512c so as to rotate in conjunction with the gear 512c. Each cam disc and associated inner gear 512c or 512d, are operably oriented in this same configuration. In addition, the follower and/or other portions of the valve mechanism are oriented with respect to the cylinder housing such that the valve opens and closes as the follower 539 engages and follows the camming surfaces 556, as previously described.

FIGS. 1-5, illustrate a first embodiment of the present invention, and exemplifies the internal components of the cylinder and crankshaft housings (not shown in these FIGURES). A plurality of drive gears 512a, 512b, 512c, 512d, constitute an engine drive train 512. As shown, the teeth 512e of each respective gear is enmeshed, interlocked, or engaged with at least one of the juxtaposed and linearly-oriented drive gears 512a-512d.

A first crankshaft 540 is coaxially fixed to the first gear 512a, through medial portion 512a' of the first gear 512a. A first rod 522 is also coaxially fixed about a first end of the first crankshaft 540, and fixed to a first piston 520, for cycling the first piston 520 within a first cylinder 510. A second rod 522' is fixed about a second end of the first crankshaft 540, and fixed to a second piston 522', for cycling the second piston 522' within a second cylinder 510'. A third gear 512c is rotatably engaged with the first drive gear 512a. A first cam disc 550 and a second cam disc 550' are rotatably, coaxially, and concentrically oriented with, or fixed to, the third gear 512c, each cam disc about an opposite side of the gear 512c.

A first valve assembly 530 is fixed above the engine and operatively connected to the cam disc 550, for opening and closing of a first inlet valve 525 also operatively connected to the first valve assembly 530. A first valve seat 525a functions as a guide and a seat for the first valve 525 as the plurality of arms 537, 539, 541, and 543 of the first valve assembly 560 respond to the cam follower 539, as described above, to thereby actuate the first inlet valve 525 in conjunction with the cam profile 556 of the cam disc 550.

A second valve assembly 562 is fixed above the engine and is operatively connected to the cam disc 550', for opening and closing of a second inlet valve 525' also operatively connected to the second valve assembly 562. A second valve seat 525a' functions as a guide and a seat for the second inlet valve 525' as the plurality of arms 537, 539, 541, and 543 of the second valve assembly 530 respond to the cam follower 539, as described above, to thereby actuate the second inlet valve 525' in conjunction with the cam profile 556 of the cam disc 550'.

A second crankshaft 542 is coaxially fixed to the second gear 512b, through medial portion 512b' of the second gear 512b. A third rod 532 is also coaxially fixed about a first end of the second crankshaft 542, and fixed to a third piston 530, for cycling the first piston 530 within a first cylinder 510. A fourth rod 532' is fixed about a second end of the second crankshaft 542, and fixed to a fourth piston 530', for cycling the fourth piston 530' within the second cylinder 510'. A fourth gear 512d is rotatably engaged with the first drive gear 512b and the third drive gear 512c. A third cam disc 552 and a fourth cam disc 552' are rotatably, coaxially, and concentrically oriented with, or fixed to, the fourth gear 512d, each cam disc about an opposite side of the gear 512d.

A third valve assembly 534 is beneath the engine 500 and operatively connected to the cam disc 552, for opening and closing of a first exhaust valve 527 also operatively connected to the third valve assembly 534. A third valve seat 525c functions as a guide and a seat for the first exhaust valve 527 as the plurality of arms 537, 539, 541, and 543 of the third valve assembly 534 respond to the cam follower 539, as described above, to thereby actuate the first exhaust valve 527a in conjunction with the cam profile 556 of the cam disc 552.

A fourth valve assembly 534 is operatively connected to the cam disc 552', for opening and closing of a second exhaust valve 527' also operatively connected to the fourth valve assembly 534. A fourth valve seat 527a' functions as a guide and a seat for the second exhaust valve 527' as the plurality of arms 537, 539, 541, and 543 of the fourth valve assembly 534 respond to the cam follower 539, as described above, to thereby actuate the second exhaust valve 527' in conjunction with the cam profile 556 of the cam disc 550'.

Figure 6:
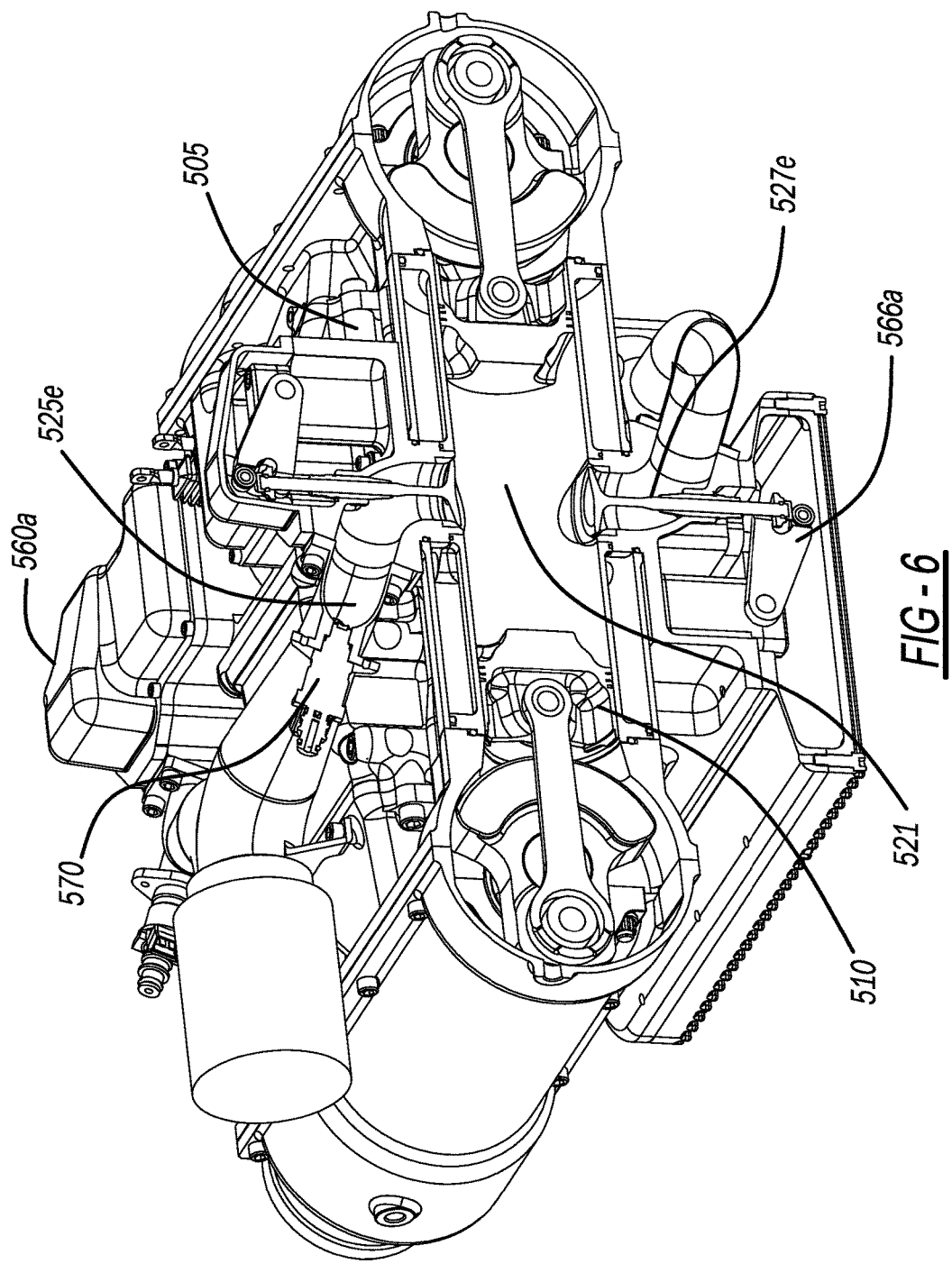
FIG. 6 is a cross-sectional view of two opposed pistons within an associated cylinder.
Figure 7:
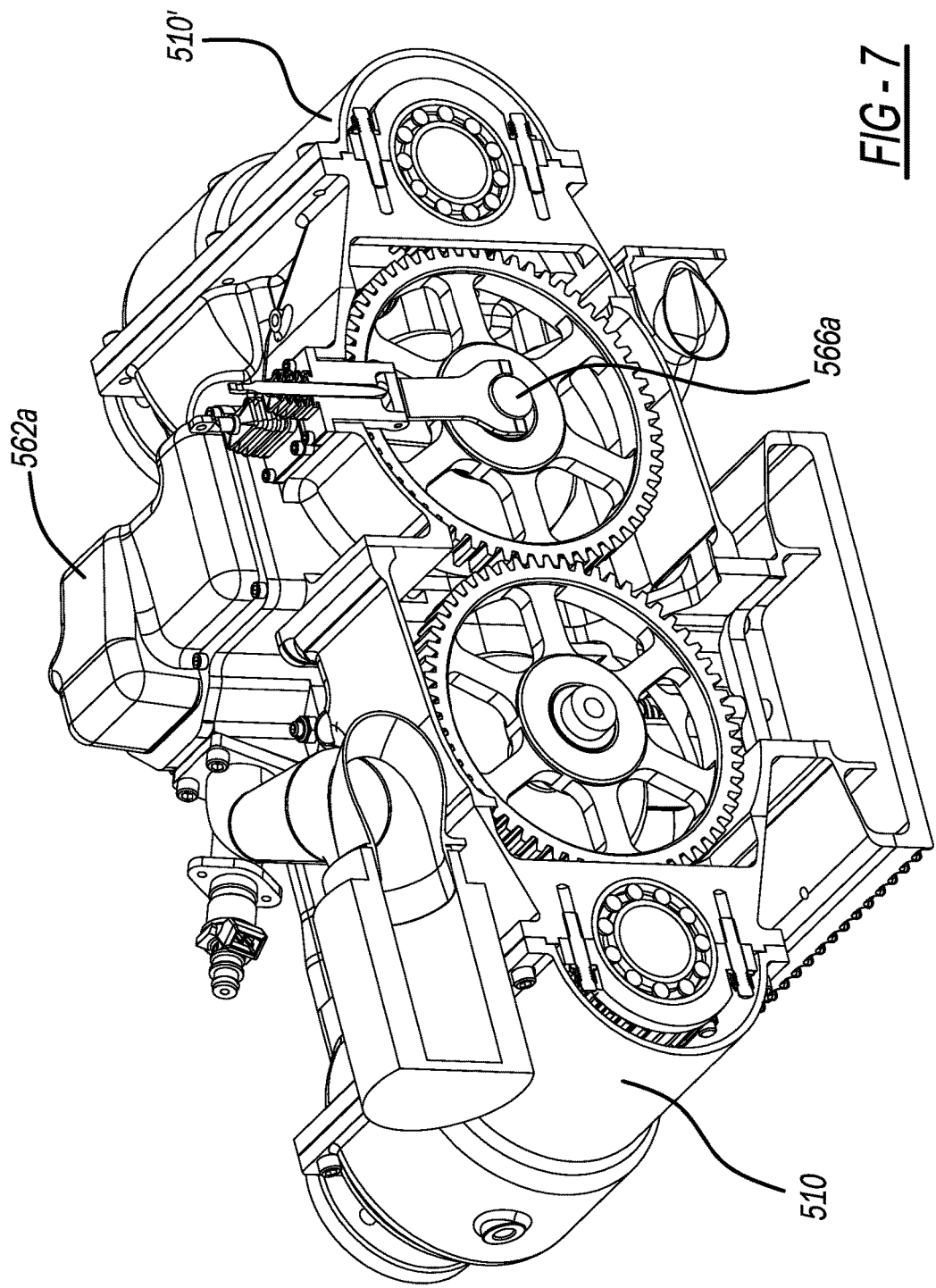
FIG. 7 is illustrates valve covers in a preferred engine.
Figure 9:
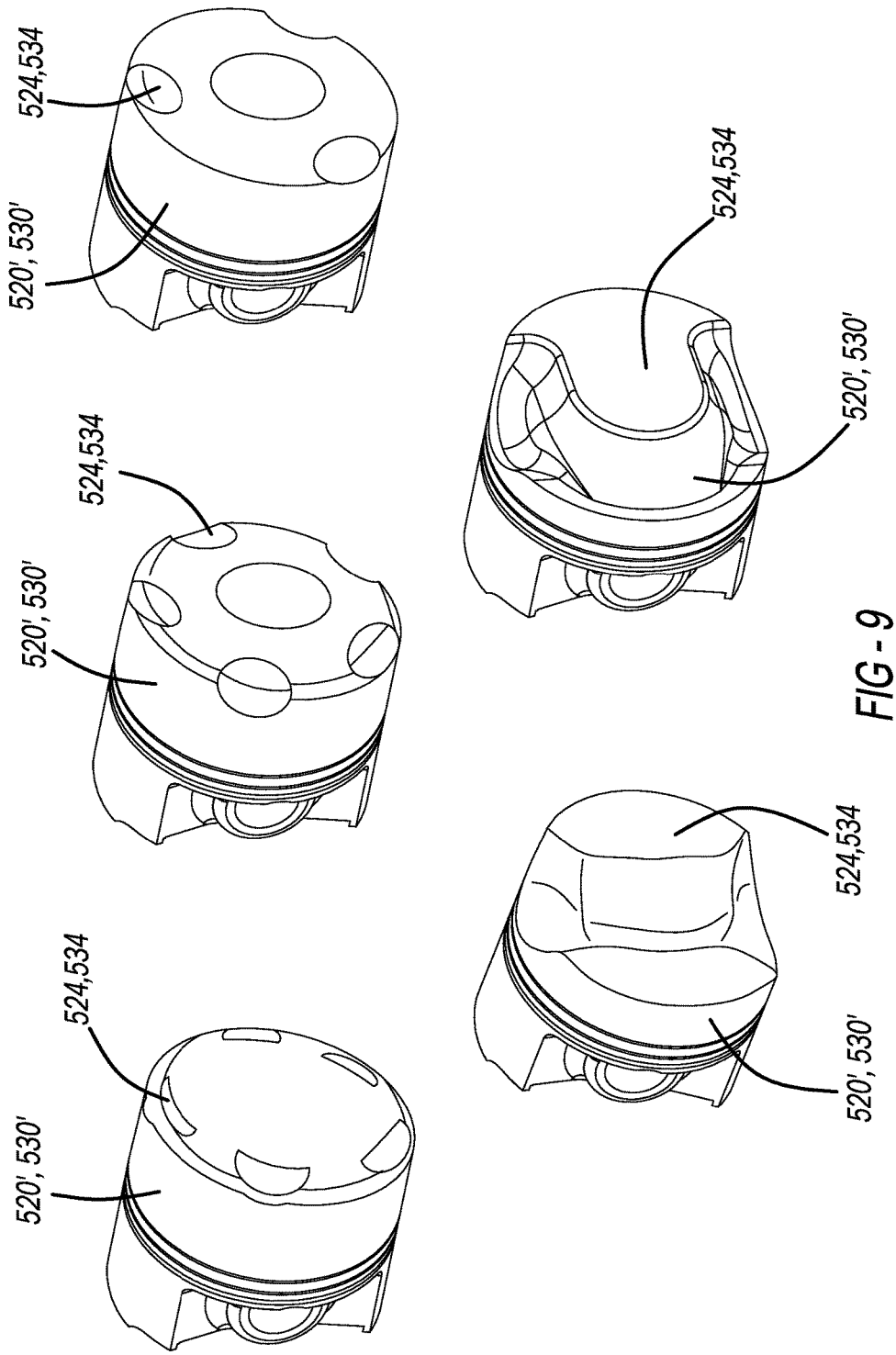
FIG. 9 illustrates various piston faces in accordance with the present invention.
Figure 10:
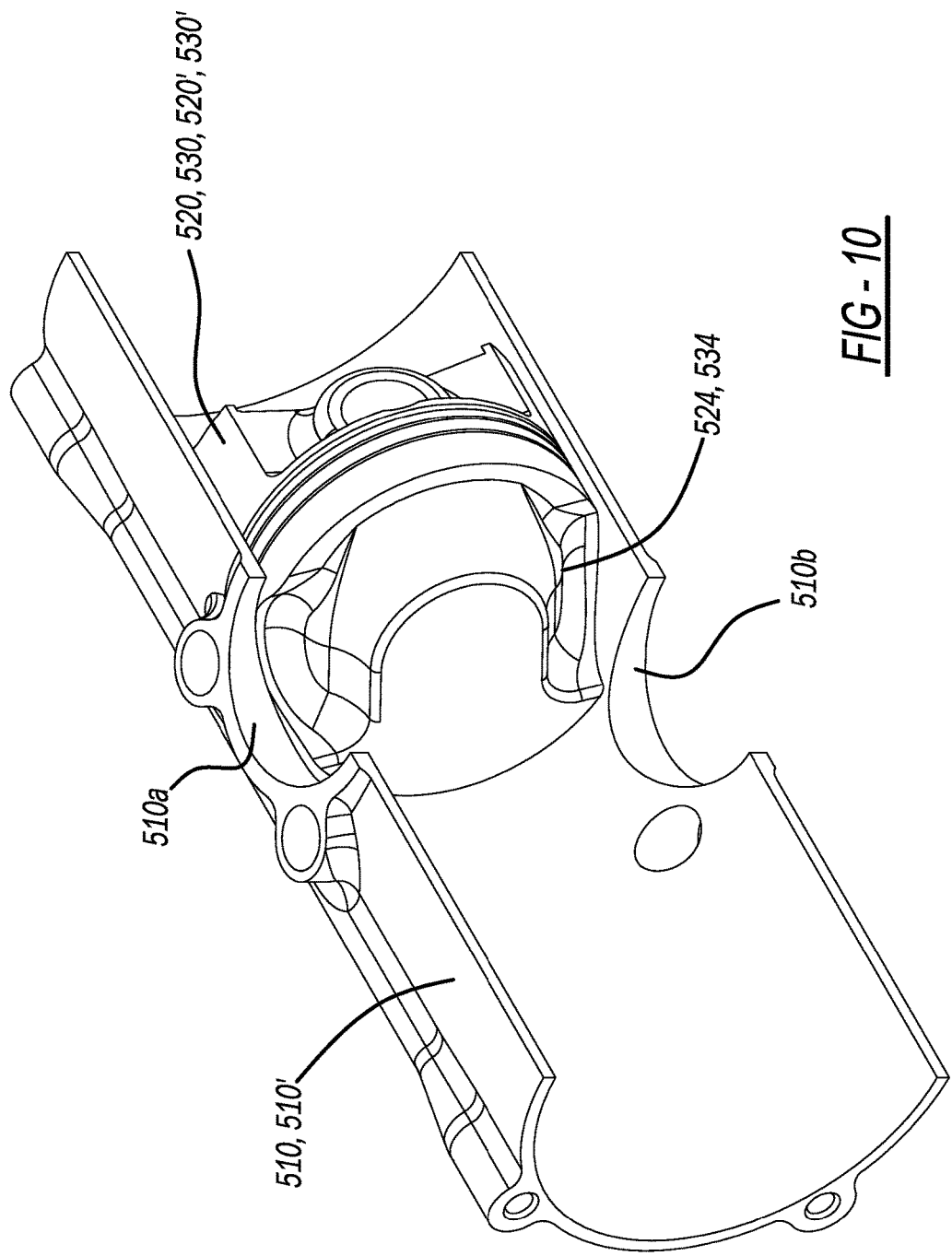
FIG. 10 illustrates a perspective cross-section of the combustion chamber and piston face in a preferred engine.

As shown in FIGS. 6 and 7, for example, each valve assembly has a corresponding valve housing or cover 530a, 532a, 534a, and 536a. Each set of pistons and rods has a corresponding cylinder 510, 510' for providing a combustion chamber and for providing a sealed environment for the four-stroke engine process. As shown in FIG. 6, each inlet valve 525 has an inlet conduit 525e for providing inlet air to the engine during the inlet cycle. Each exhaust valve 527 has an exhaust conduit 527e for removing the exhaust gases from the cylinders during the exhaust cycle. Each cylinder 510, 510' has a spark plug that communicates with a central combustion chamber 521 formed between the piston caps 524,534 or interfaces when each of the pair of opposed pistons are at Top Dead Center. As shown in FIGS. 9-10, the piston cap 524,534 may be varied in shape to provide a desired geometry of the combustion chamber 521. It has been found that providing a large central area of combustion in the combustion chamber 521 provides for more efficient combustion and more efficient communication with the spark plug initiator 570.

Figure 11A:
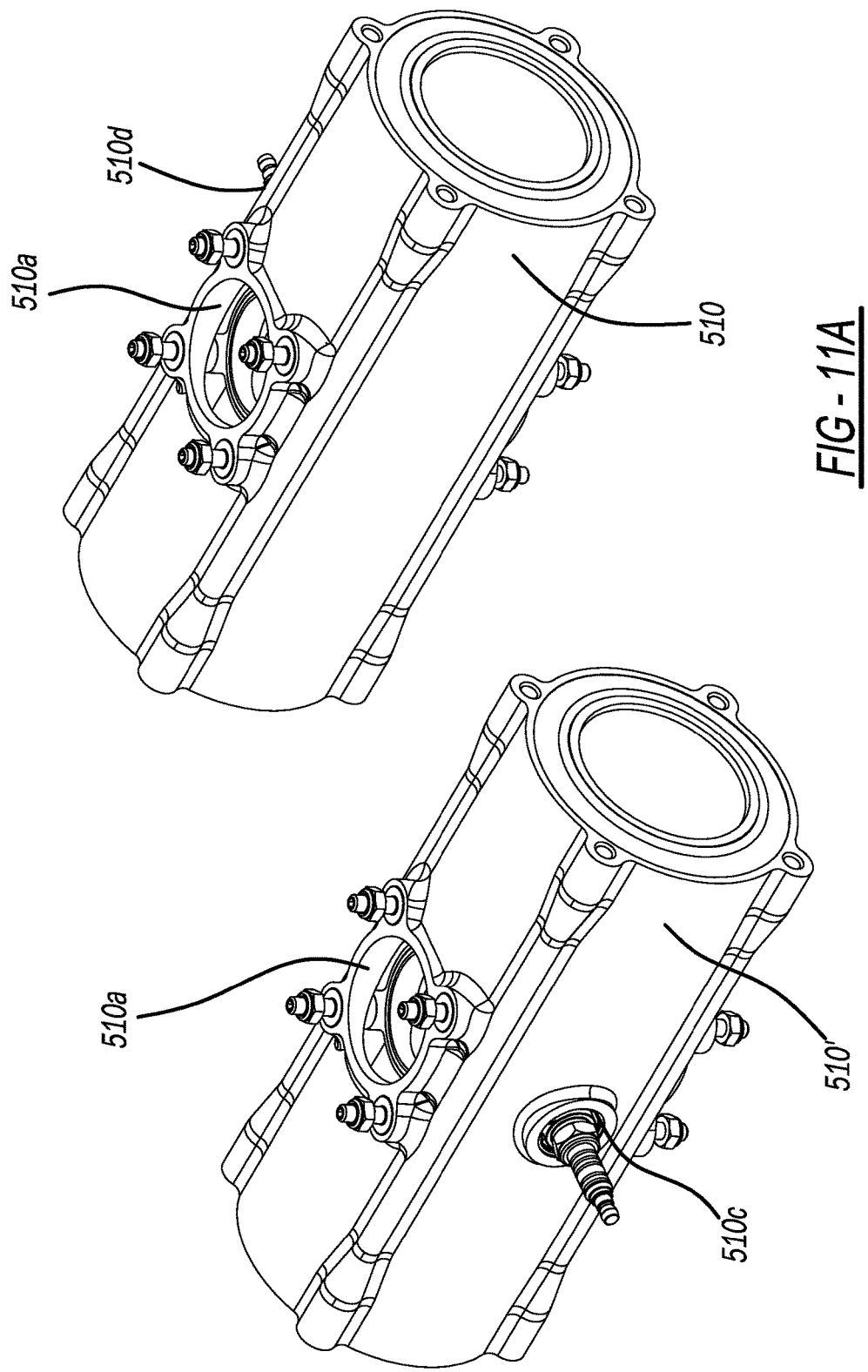
FIG. 11A illustrates two exemplary cylinders in accordance with the present invention.
Figure 11B:
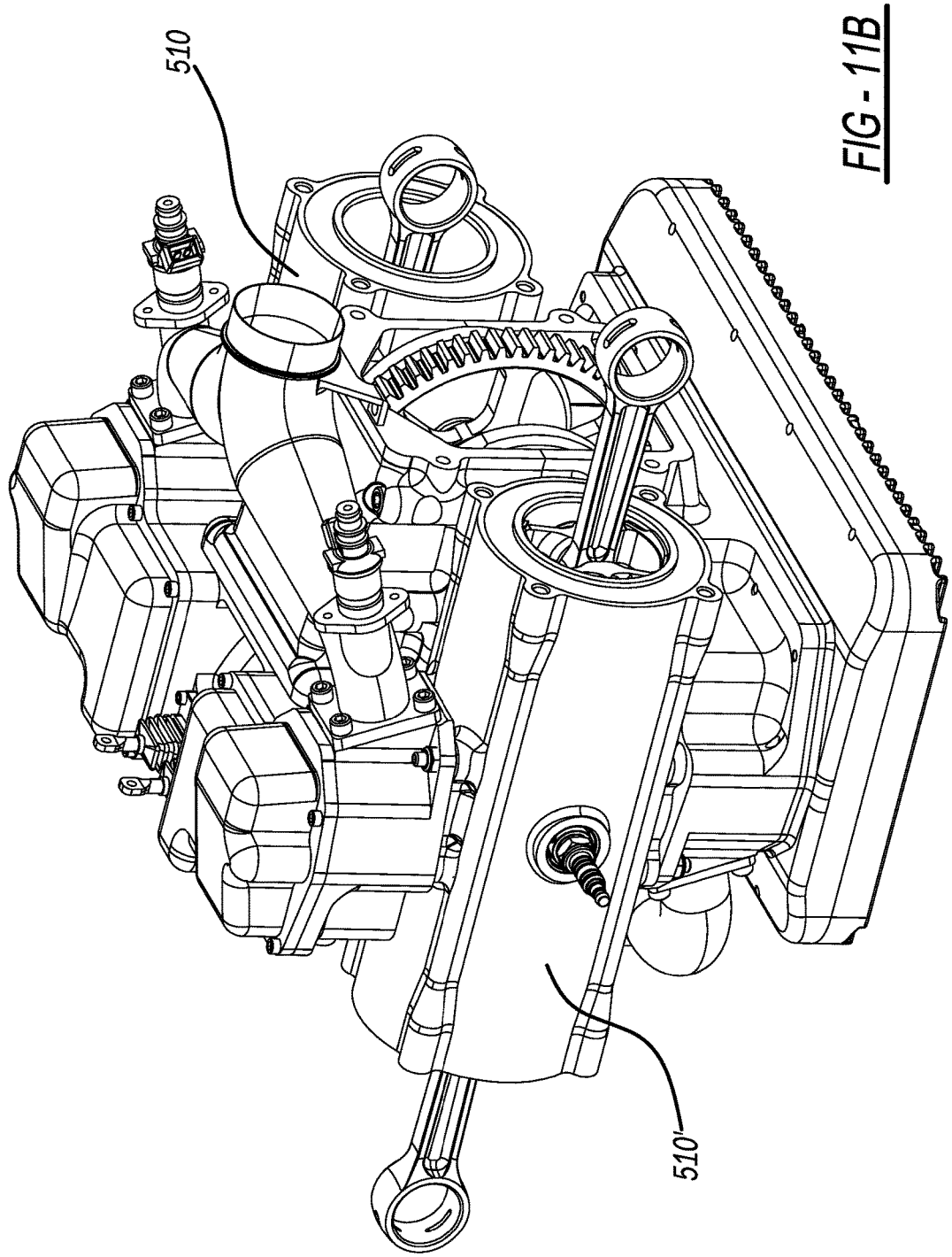
FIG. 11B illustrates two exemplary cylinders of FIG. 11A, with a valve assembly mounted thereon.
Figure 12:
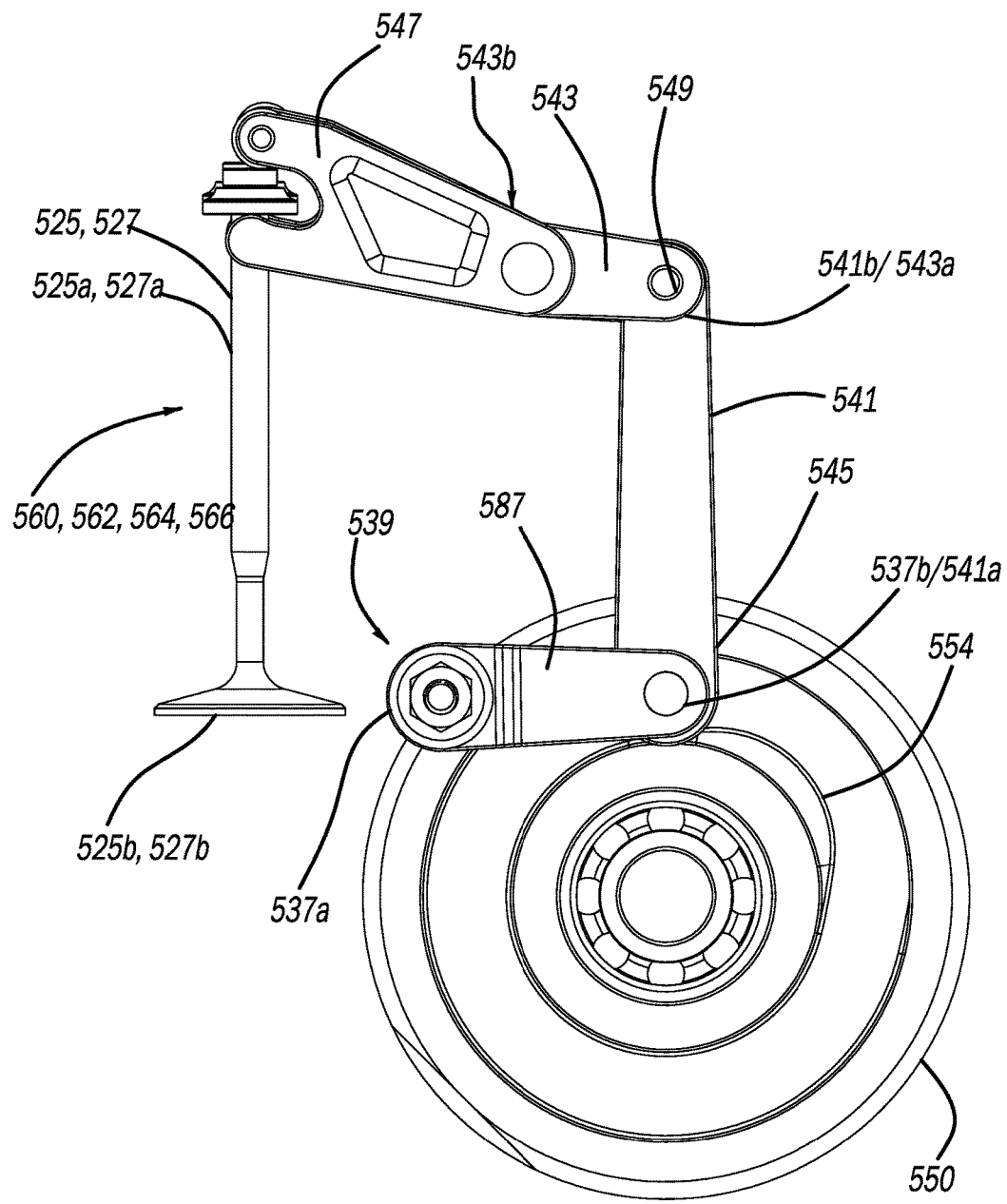
FIG. 12 illustrates an exemplary valve and cam assembly, in accordance with the present invention.
Figure 13:
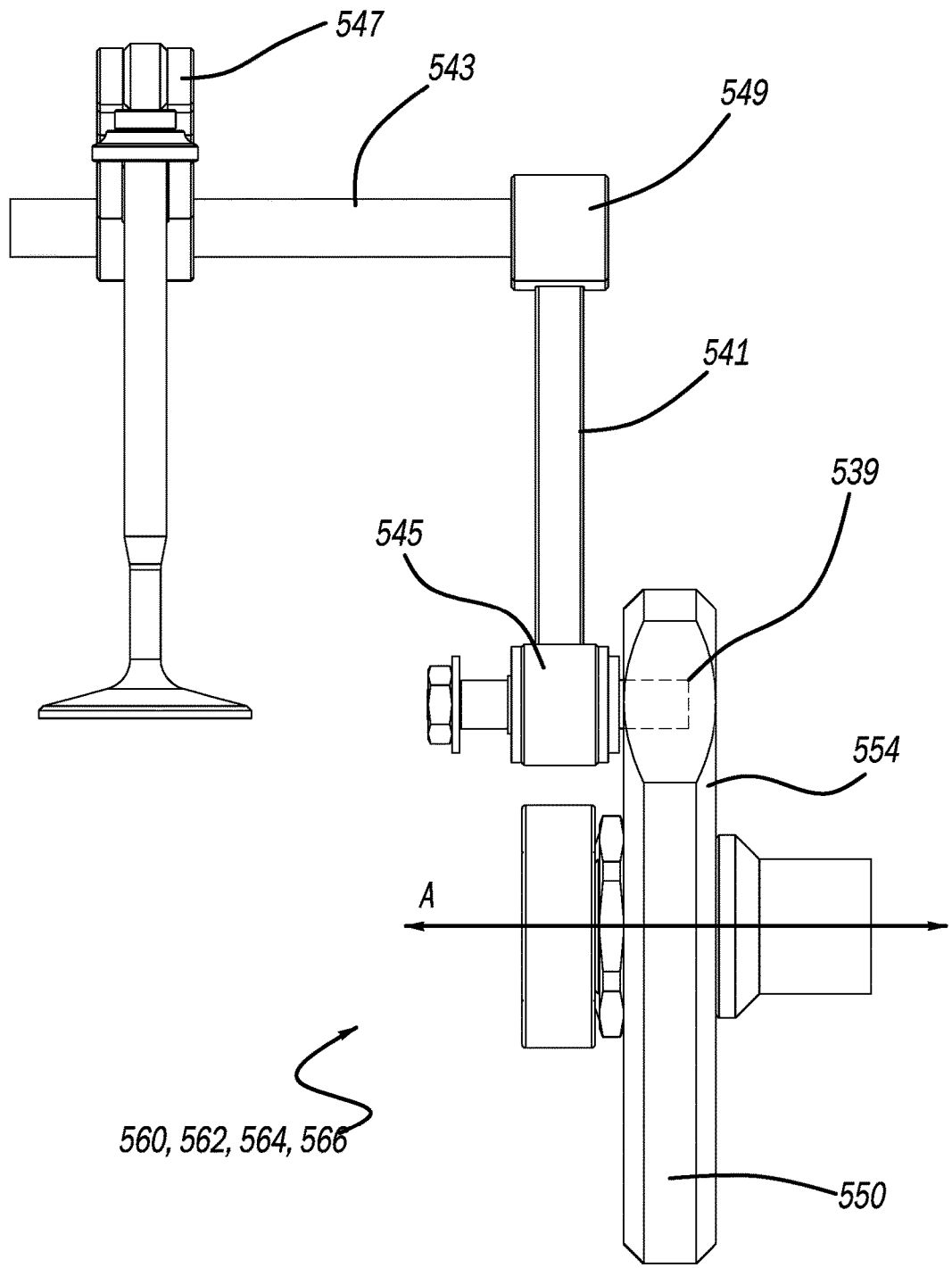
FIG. 13 illustrates a rear view of the valve and cam assembly of FIG. 12.

Other housing components of the engine 500 are illustrated in FIGS. 11A-13. FIG. 11A illustrates the cylinders 510, 510' containing cylinder openings 510a and 510b, and spark plug openings 510c and 510d. Spark plugs 510c1 and 510d1 are contained within the spark plug openings 510c and 510d, respectively. FIG. 11B illustrates the cylinders 510, 510' for housing the pistons, and, FIGS. 6 and 7 illustrate the valve housings 560a, 562a, 564a, 566a. FIG. 12 further illustrates the crankshaft housing components whereby a first half (or first half of a clam shell) of the first crankshaft housing of the first crankshaft is shown, and, a first half of the second crankshaft housing of the second crankshaft is shown. FIG. 13 illustrates a bottom half of the crankshaft housings for both the first and the second crankshafts, thereby sealing in the operative oil or lubricant for each crankshaft. FIGS. 14 and 15 provide a perspective view and a side view of the Desmodromic valve assembly, in accordance with the present invention. As shown in the FIGS. 14 and 15, the respective valve assembly and cam disc are shown in operative communication with each other. If desired, an overall engine housing (505) may be provided to cover the engine components.

FIG. 16 schematically illustrates another embodiment of the present invention whereby a pair of intake valves and a pair of exhaust valves are actuated by corresponding valve assemblies (not shown). A fuel injector and a coolant jacket are also exemplified in FIG. 16 whereby the cylinder is cooled by a suitable coolant as known in the art. A spark plug is centrally located to efficiently initiate the combustion process, in accordance with the present invention. FIG. 17, in one embodiment, illustrates the interface of two opposed pistons whereby the piston cap interface at top dead center (TDC) forms a toroidal combustion chamber 521. The valves 525 and 527 are also seated within opposed detents or cavities 520f, 530f, 520f, 530f' formed in the top and bottom of the pistons, that when combined work to seal the valve/piston interface during the four-stroke process, and during operation of the valves as they open and close.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined only by the appended claims and their equivalents.

What is claimed is:

1. An energy recovery system comprising:
a housing containing an exhaust vent;
a first pressure vessel contained within the housing for heating a first fluid, said first pressure vessel containing said first fluid;
a second pressure vessel contained within the first pressure vessel for containing a second fluid, such that said second pressure vessel is immersed in said first pressure vessel, said second pressure vessel containing said second fluid;
a four-stroke opposed-piston engine contained within the housing, said engine containing an intake valve and an exhaust valve wherein said exhaust valve fluidically communicates with the housing exhaust vent and thermodynamically communicates with said second fluid;
at least one electric generator operatively communicating with the four-stroke opposed piston engine; and
a cooling jacket disposed about said four-stroke opposed piston engine, said cooling jacket containing a coolant, said coolant thermodynamically communicating with said first fluid.

2. The energy recovery system of claim 1 further comprising:
a first heat exchanger fluidically communicating with the exhaust valve and the exhaust vent, and thermodynamically communicating with the second fluid; and
a second heat exchanger fluidically communicating with the coolant of the cooling jacket and thermodynamically communicating with the first fluid.

3. The energy recovery system of claim 1 wherein said first fluid is water.

4. The energy recovery system of claim 1 wherein said second fluid is water.

5. A combined heat and power system comprising:
a four-stroke opposed piston engine for generating heat and power, and
a pressurized heating system including a first pressure vessel containing a first fluid in thermodynamic communication with an exhaust stream of said engine, and a second pressure vessel containing said first pressure vessel, said second pressure vessel containing a second fluid in thermodynamic communication with a coolant of said engine.

6. The combined heat and power system of claim 5 further comprising a dampening system in operable communication with said four-stroke opposed piston engine.

7. A combined heat and power system comprising:
a first pressure vessel containing a first fluid, and
a second pressure vessel contained within said first pressure vessel and containing a second fluid, said second pressure vessel containing a fluid inlet and a fluid outlet, said first and second fluids in thermodynamic communication with at least one heat source,
wherein said heat source is a four-stroke opposed piston engine,
wherein said four-stroke opposed piston engine provides exhaust thermodynamically communicating with said second pressure vessel,
wherein said four-stroke opposed piston engine contains a coolant thermodynamically communicating with said first pressure vessel.

8. The combined heat and power system of claim 7 wherein said first pressure vessel contains a first heat exchanger in fluid communication with said heat source.

9. The combined heat and power system of claim 8 wherein said first heat exchanger is in fluid communication with said coolant of said four-stroke opposed piston engine.

10. The combined heat and power system of claim 9 wherein said coolant stream is proximate to the first pressure vessel as the coolant stream enters the first heat exchanger.

11. The combined heat and power system of claim 7 wherein said second pressure vessel contains a second heat exchanger in fluid communication with said heat source.

12. The combined heat and power system of claim 11 wherein said second heat exchanger is in fluid communication with said exhaust of said four-stroke opposed piston engine.

13. The combined heat and power system of claim 7 wherein said first and second fluids are water.

* * * * *